US007862162B2

(12) United States Patent
Hibbard et al.

(10) Patent No.: US 7,862,162 B2
(45) Date of Patent: Jan. 4, 2011

(54) LOW INSERTION FORCE FLUID COUPLING

(75) Inventors: Christopher Hibbard, Balmain (AU); Geoffrey Philip Dyer, Balmain (AU); Paul Ian Mackey, Balmain (AU); Makomo Tsubono, Balmain (AU); Attila Bertok, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 367 days.

(21) Appl. No.: 12/014,771

(22) Filed: Jan. 16, 2008

(65) Prior Publication Data

US 2009/0179968 A1 Jul. 16, 2009

(51) Int. Cl.

| | |
|---|---|
| ***B41J 2/175*** | (2006.01) |
| ***B41J 2/155*** | (2006.01) |
| ***B41J 2/17*** | (2006.01) |
| ***F16L 17/00*** | (2006.01) |

(52) U.S. Cl. ............................ 347/85; 347/42; 347/84; 347/86; 347/87; 285/10

(58) Field of Classification Search .................. 347/42, 347/84–87

See application file for complete search history.

(56) References Cited

U.S. PATENT DOCUMENTS

| | | | | |
|---|---|---|---|---|
| 2002/0163566 | A1 | 11/2002 | Jang et al. | |
| 2003/0020040 | A1 | 1/2003 | Anderson | |
| 2003/0090540 | A1 * | 5/2003 | Shimizu | 347/49 |
| 2003/0197765 | A1 | 10/2003 | Dod et al. | |
| 2007/0126820 | A1 * | 6/2007 | Silverbrook et al. | 347/86 |

* cited by examiner

*Primary Examiner*—Charlie Peng
*Assistant Examiner*—Hung Lam

(57) ABSTRACT

A fluid coupling for establishing a sealed connection between a first conduit and a second conduit that has a seal seat and a compression member. The compression member is movable relative to the seal seat in which an annular seal is positioned. An engagement mechanism moves the second conduit from a disengaged position where there is no sealed fluid connection between the first and second conduits, to an engaged position where the compression member moves toward the seal seat to compress the annular seal to form a sealed fluid connection.

18 Claims, 9 Drawing Sheets

LOW INSERTION FORCE FLUID COUPLING

FIELD OF THE INVENTION

The present invention relates to fluidic couplings and in particular, ink couplings within inkjet printers.

CO-PENDING APPLICATIONS

The following applications have been filed by the Applicant simultaneously with the present application:

| | | | | | |
|---|---|---|---|---|---|
| 12/014,767 | 12/014,768 | 12/014,769 | 12/014,770 | 7,758,149 | 12/014,773 |
| 7,758,152 | 12/014,775 | 7,753,477 | 12/014,777 | 12/014,778 | 12/014,779 |
| 12/014,780 | 12/014,781 | 7,815,282 | 12/014,783 | 12/014,784 | 12/014,785 |
| 12/014,787 | 7,753,478 | 12/014,789 | 12/014,790 | 12/014,791 | 7,771,002 |
| 12/014,793 | 7,766,451 | 7,771,007 | 7,819,500 | 12/014,801 | 12/014,803 |
| 12/014,804 | 12/014,805 | 12/014,806 | 12/014,807 | | |

The disclosures of these co-pending applications are incorporated herein by reference.

CROSS REFERENCES

The following patents or patent applications filed by the applicant or assignee of the present invention are hereby incorporated by cross-reference.

| | | | | | | |
|---|---|---|---|---|---|---|
| 6,276,850 | 6,520,631 | 6,158,907 | 6,539,180 | 6,270,177 | 6,405,055 | 6,628,430 |
| 6,835,135 | 6,626,529 | 6,981,769 | 7,125,338 | 7,125,337 | 7,136,186 | 7,286,260 |
| 7,145,689 | 7,130,075 | 7,081,974 | 7,177,055 | 7,209,257 | 6,443,555 | 7,161,715 |
| 7,154,632 | 7,158,258 | 7,148,993 | 7,075,684 | 10/943,905 | 10/943,906 | 10/943,904 |
| 10/943,903 | 10/943,902 | 6,966,659 | 6,988,841 | 7,077,748 | 7,255,646 | 7,070,270 |
| 7,014,307 | 7,158,809 | 7,217,048 | 11/225,172 | 11/255,942 | 11/329,039 | 11/329,040 |
| 7,271,829 | 11/442,189 | 11/474,280 | 11/483,061 | 11/503,078 | 11/520,735 | 11/505,858 |
| 11/525,850 | 11/583,870 | 11/592,983 | 11/592,208 | 11/601,828 | 11/635,482 | 11/635,526 |
| 10/466,440 | 7,215,441 | 11/650,545 | 11/653,241 | 11/653,240 | 7,056,040 | 6,942,334 |
| 11/706,300 | 11/740,265 | 11/737,720 | 11/739,056 | 11/740,204 | 11/740,223 | 11/753,557 |
| 11/750,285 | 11,758,648 | 11/778,559 | 11,834,634 | 11/838,878 | 11,845,669 | 6,799,853 |
| 7,237,896 | 6,749,301 | 10/451,722 | 7,137,678 | 7,252,379 | 7,144,107 | 10/503,900 |
| 10/503,898 | 10/503,897 | 7,220,068 | 7,270,410 | 7,241,005 | 7,108,437 | 7,140,792 |
| 10/503,922 | 7,224,274 | 10/503,917 | 10/503,918 | 10/503,925 | 10/503,927 | 10/503,928 |
| 10/503,929 | 10/503,885 | 7,195,325 | 7,229,164 | 7,150,523 | 10/503,889 | 7,154,580 |
| 6,906,778 | 7,167,158 | 7,128,269 | 6,688,528 | 6,986,613 | 6,641,315 | 7,278,702 |
| 10/503,891 | 7,150,524 | 7,155,395 | 6,915,140 | 6,999,206 | 6,795,651 | 6,883,910 |
| 7,118,481 | 7,136,198 | 7,092,130 | 6,786,661 | 6,808,325 | 10/920,368 | 10/920,284 |
| 7,219,990 | 10/920,283 | 6,750,901 | 6,476,863 | 6,788,336 | 6,322,181 | 6,597,817 |
| 6,227,648 | 6,727,948 | 6,690,419 | 10/470,947 | 6,619,654 | 6,969,145 | 6,679,582 |
| 10/470,942 | 6,568,670 | 6,866,373 | 7,280,247 | 7,008,044 | 6,742,871 | 6,966,628 |
| 6,644,781 | 6,969,143 | 6,767,076 | 6,834,933 | 6,692,113 | 6,913,344 | 6,727,951 |
| 7,128,395 | 7,036,911 | 7,032,995 | 6,969,151 | 6,955,424 | 6,969,162 | 10/919,249 |
| 6,942,315 | 11/006,577 | 7,234,797 | 6,986,563 | 7,295,211 | 11/045,442 | 7,286,162 |
| 7,283,159 | 7,077,330 | 6,196,541 | 11/149,389 | 11/185,725 | 7,226,144 | 11/202,344 |
| 7,267,428 | 11/248,423 | 11/248,422 | 7,093,929 | 11/282,769 | 11/330,060 | 11/442,111 |
| 7,290,862 | 11/499,806 | 11/499,710 | 6,195,150 | 11,749,156 | 11,782,588 | 11/854,435 |
| 11/853,817 | 11/935,958 | 11,924,608 | 6,362,868 | 11,970,993 | 6,831,681 | 6,431,669 |
| 6,362,869 | 6,472,052 | 6,356,715 | 6,894,694 | 6,636,216 | 6,366,693 | 6,329,990 |
| 6,459,495 | 6,137,500 | 6,690,416 | 7,050,143 | 6,398,328 | 7,110,024 | 6,431,704 |
| 6,879,341 | 6,415,054 | 6,665,454 | 6,542,645 | 6,486,886 | 6,381,361 | 6,317,192 |
| 6,850,274 | 09/113,054 | 6,646,757 | 6,624,848 | 6,357,135 | 6,271,931 | 6,353,772 |
| 6,106,147 | 6,665,008 | 6,304,291 | 6,305,770 | 6,289,262 | 6,315,200 | 6,217,165 |
| 6,496,654 | 6,859,225 | 6,924,835 | 6,647,369 | 6,943,830 | 09/693,317 | 7,021,745 |
| 6,712,453 | 6,460,971 | 6,428,147 | 6,416,170 | 6,402,300 | 6,464,340 | 6,612,687 |
| 6,412,912 | 6,447,099 | 6,837,567 | 6,505,913 | 7,128,845 | 6,733,684 | 7,249,108 |
| 6,566,858 | 6,331,946 | 6,246,970 | 6,442,525 | 09/517,384 | 09/505,951 | 6,374,354 |
| 7,246,098 | 6,816,968 | 6,757,832 | 6,334,190 | 6,745,331 | 7,249,109 | 10/203,559 |
| 7,197,642 | 7,093,139 | 10/636,263 | 10/636,283 | 10/866,608 | 7,210,038 | 10/902,883 |
| 10/940,653 | 10/942,858 | 11/706,329 | 11/757,385 | 11/758,642 | 7,119,836 | 7,283,162 |
| 7,286,169 | 10/636,285 | 7,170,652 | 6,967,750 | 6,995,876 | 7,099,051 | 7,172,191 |
| 7,243,916 | 7,222,845 | 11/239,232 | 7,285,227 | 7,063,940 | 11/107,942 | 7,193,734 |
| 7,086,724 | 7,090,337 | 7,278,723 | 7,140,717 | 11/190,902 | 11/209,711 | 7,256,824 |
| 7,140,726 | 7,156,512 | 7,186,499 | 11/478,585 | 11/525,862 | 11/540,574 | 11/583,875 |
| 11/592,181 | 6,750,944 | 11/599,336 | 7,291,447 | 11,744,183 | 11/758,646 | 11/778,561 |

-continued

| | | | | | | |
|---|---|---|---|---|---|---|
| 11/839,532 | 11/838,874 | 11/853,021 | 11/869,710 | 11/868,531 | 11,927,403 | 11,951,960 |
| 10/636,225 | 6,985,207 | 6,773,874 | 6,650,836 | 10/666,495 | 10/636,224 | 7,250,975 |
| 7,295,343 | 6,880,929 | 7,236,188 | 7,236,187 | 7,155,394 | 10/636,219 | 10/636,223 |
| 7,055,927 | 6,986,562 | 7,052,103 | 7,312,845 | 10/656,281 | 10/656,791 | 10/666,124 |
| 10/683,217 | 7,289,142 | 7,095,533 | 6,914,686 | 6,896,252 | 6,820,871 | 6,834,851 |
| 6,848,686 | 6,830,246 | 6,851,671 | 10/729,098 | 7,092,011 | 7,187,404 | 10/729,159 |
| 10/753,458 | 6,878,299 | 6,929,348 | 6,921,154 | 10/780,625 | 10/804,042 | 6,913,346 |
| 10/831,238 | 10/831,237 | 10/831,239 | 10/831,240 | 10/831,241 | 10/831,234 | 10/831,233 |
| 7,246,897 | 7,077,515 | 10/831,235 | 10/853,336 | 10/853,117 | 10/853,659 | 10/853,681 |
| 6,913,875 | 7,021,758 | 7,033,017 | 7,161,709 | 7,099,033 | 7,147,294 | 7,156,494 |
| 11/012,024 | 11/011,925 | 7,032,998 | 7,044,585 | 7,296,867 | 6,994,424 | 11/006,787 |
| 7,258,435 | 7,097,263 | 7,001,012 | 7,004,568 | 7,040,738 | 7,188,933 | 7,027,080 |
| 7,025,446 | 6,991,321 | 7,131,715 | 7,261,392 | 7,207,647 | 7,182,435 | 7,097,285 |
| 11/228,410 | 7,097,284 | 7,083,264 | 7,147,304 | 7,232,203 | 7,156,498 | 7,201,471 |
| 11/501,772 | 11/503,084 | 11/513,073 | 7,210,764 | 11/635,524 | 11/706,379 | 11/730,386 |
| 11/730,784 | 11/753,568 | 11/782,591 | 11/859,783 | 6,710,457 | 6,775,906 | 6,507,099 |
| 7,221,043 | 7,107,674 | 7,154,172 | 11/442,400 | 7,247,941 | 11/736,540 | 7,307,354 |
| 11/940,304 | 6,530,339 | 6,631,897 | 6,851,667 | 6,830,243 | 6,860,479 | 6,997,452 |
| 7,000,913 | 7,204,482 | 11/212,759 | 11/281,679 | 11/730,409 | 6,238,044 | 6,425,661 |
| 11/003,786 | 7,258,417 | 7,293,853 | 11/003,334 | 7,270,395 | 11/003,404 | 11/003,419 |
| 11/003,700 | 7,255,419 | 7,284,819 | 7,229,148 | 7,258,416 | 7,273,263 | 7,270,393 |
| 6,984,017 | 11/003,699 | 11/071,473 | 7,156,497 | 11/601,670 | 11,748,482 | 11/778,563 |
| 11/779,851 | 11/778,574 | 11/853,816 | 11/853,814 | 11/853,786 | 11/872,037 | 11/856,694 |
| 11,965,703 | 11,971,170 | 11/003,463 | 11/003,701 | 11/003,683 | 11/003,614 | 7,284,820 |
| 11/003,684 | 7,246,875 | 11/003,617 | 11/764,760 | 11,853,777 | 11,955,354 | 11/293,800 |
| 11/293,802 | 11/293,801 | 11/293,808 | 11/293,809 | 11/482,975 | 11/482,970 | 11/482,968 |
| 11/482,972 | 11/482,971 | 11/482,969 | 6,431,777 | 6,334,664 | 6,447,113 | 7,239,407 |
| 6,398,359 | 6,652,089 | 6,652,090 | 7,057,759 | 6,631,986 | 7,187,470 | 7,280,235 |
| 11/501,775 | 11,744,210 | 11/859,784 | 6,471,331 | 6,676,250 | 6,347,864 | 6,439,704 |
| 6,425,700 | 6,588,952 | 6,626,515 | 6,722,758 | 6,871,937 | 11/060,803 | 11/097,266 |
| 11/097,267 | 11/685,084 | 11/685,086 | 11/685,090 | 11/740,925 | 11/763,444 | 11/763,443 |
| 11,946,840 | 11,961,712 | 7,249,942 | 7,206,654 | 7,162,324 | 7,162,325 | 7,231,275 |
| 7,146,236 | 7,278,847 | 10/753,499 | 6,997,698 | 7,220,112 | 7,231,276 | 10/753,440 |
| 7,220,115 | 7,195,475 | 7,144,242 | 7,306,323 | 7,306,319 | 11/525,858 | 11/545,501 |
| 11/599,335 | 11/706,380 | 11,736,545 | 11/736,554 | 11/739,047 | 11,749,159 | 11/739,073 |
| 11/775,160 | 11/853,755 | 11/940,291 | 11,934,071 | 11,951,913 | 6,786,420 | 6,827,282 |
| 6,948,661 | 7,073,713 | 10/983,060 | 7,093,762 | 7,083,108 | 7,222,799 | 7,201,319 |
| 11/442,103 | 11/739,071 | 11/518,238 | 11/518,280 | 11/518,244 | 11/518,243 | 11/518,242 |
| 7,032,899 | 6,854,724 | 11/084,237 | 11/084,240 | 11/084,238 | 11/357,296 | 11/357,298 |
| 11/357,297 | 6,350,023 | 6,318,849 | 6,592,207 | 6,439,699 | 6,312,114 | 11/246,676 |
| 11/246,677 | 11/246,678 | 11/246,679 | 11/246,680 | 11/246,681 | 11/246,714 | 11/246,713 |
| 11/246,689 | 11/246,671 | 11/246,670 | 11/246,669 | 11/246,704 | 11/246,710 | 11/246,688 |
| 11/246,716 | 11/246,715 | 11/246,707 | 11/246,706 | 11/246,705 | 11/246,708 | 11/246,693 |
| 11/246,692 | 11/246,696 | 11/246,695 | 11/246,694 | 11/482,958 | 11/482,955 | 11/482,962 |
| 11/482,963 | 11/482,956 | 11/482,954 | 11/482,974 | 11/482,957 | 11/482,987 | 11/482,959 |
| 11/482,960 | 11/482,961 | 11/482,964 | 11/482,965 | 11/482,976 | 11/482,973 | 11/495,815 |
| 11/495,816 | 11/495,817 | 60,992,635 | 60,992,637 | 60,992,641 | 10/803,074 | 10/803,073 |
| 7,040,823 | 10/803,076 | 10/803,077 | 10/803,078 | 10/803,079 | 10/922,971 | 10/922,970 |
| 10/922,836 | 10/922,842 | 10/922,848 | 10/922,843 | 7,125,185 | 7,229,226 | 11/513,386 |
| 11/753,559 | 10/815,621 | 7,243,835 | 10/815,630 | 10/815,637 | 10/815,638 | 7,251,050 |
| 10/815,642 | 7,097,094 | 7,137,549 | 10/815,618 | 7,156,292 | 11,738,974 | 10/815,635 |
| 10/815,647 | 10/815,634 | 7,137,566 | 7,131,596 | 7,128,265 | 7,207,485 | 7,197,374 |
| 7,175,089 | 10/815,617 | 10/815,620 | 7,178,719 | 10/815,613 | 7,207,483 | 7,296,737 |
| 7,270,266 | 10/815,614 | 11/446,240 | 11/488,162 | 11/488,163 | 11/488,164 | 11/488,167 |
| 11/488,168 | 11/488,165 | 11/488,166 | 7,267,273 | 11/834,628 | 11/839,497 | 11/944,449 |
| 10/815,636 | 7,128,270 | 11/041,650 | 11/041,651 | 11/041,652 | 11/041,649 | 11/041,610 |
| 11,863,253 | 11,863,255 | 11/863,257 | 11,863,258 | 11,863,262 | 11/041,609 | 11/041,626 |
| 11/041,627 | 11/041,624 | 11/041,625 | 11,863,268 | 11,863,269 | 11,863,270 | 11,863,271 |
| 11,863,273 | 76,584,733 | 11/041,556 | 11/041,580 | 11/041,723 | 11/041,698 | 11/041,648 |
| 11,863,263 | 11,863,264 | 11,863,265 | 11,863,266 | 11,863,267 | 10/815,609 | 7,150,398 |
| 7,159,777 | 10/815,610 | 7,188,769 | 7,097,106 | 7,070,110 | 7,243,849 | 11/442,381 |
| 11/480,957 | 11/764,694 | 11,957,470 | 6,227,652 | 6,213,588 | 6,213,589 | 6,231,163 |
| 6,247,795 | 6,394,581 | 6,244,691 | 6,257,704 | 6,416,168 | 6,220,694 | 6,257,705 |
| 6,247,794 | 6,234,610 | 6,247,793 | 6,264,306 | 6,241,342 | 6,247,792 | 6,264,307 |
| 6,254,220 | 6,234,611 | 6,302,528 | 6,283,582 | 6,239,821 | 6,338,547 | 6,247,796 |
| 6,557,977 | 6,390,603 | 6,362,843 | 6,293,653 | 6,312,107 | 6,227,653 | 6,234,609 |
| 6,238,040 | 6,188,415 | 6,227,654 | 6,209,989 | 6,247,791 | 6,336,710 | 6,217,153 |
| 6,416,167 | 6,243,113 | 6,283,581 | 6,247,790 | 6,260,953 | 6,267,469 | 6,588,882 |
| 6,742,873 | 6,918,655 | 6,547,371 | 6,938,989 | 6,598,964 | 6,923,526 | 6,273,544 |
| 6,309,048 | 6,420,196 | 6,443,558 | 6,439,689 | 6,378,989 | 6,848,181 | 6,634,735 |
| 6,299,289 | 6,299,290 | 6,425,654 | 6,902,255 | 6,623,101 | 6,406,129 | 6,505,916 |
| 6,457,809 | 6,550,895 | 6,457,812 | 7,152,962 | 6,428,133 | 7,216,956 | 7,080,895 |
| 11/144,844 | 7,182,437 | 11/599,341 | 11/635,533 | 11/607,976 | 11/607,975 | 11/607,999 |
| 11/607,980 | 11/607,979 | 11/607,978 | 11/735,961 | 11/685,074 | 11/696,126 | 11/696,144 |
| 11/696,650 | 11/763,446 | 6,224,780 | 6,235,212 | 6,280,643 | 6,284,147 | 6,214,244 |
| 6,071,750 | 6,267,905 | 6,251,298 | 6,258,285 | 6,225,138 | 6,241,904 | 6,299,786 |
| 6,866,789 | 6,231,773 | 6,190,931 | 6,248,249 | 6,290,862 | 6,241,906 | 6,565,762 |
| 6,241,905 | 6,451,216 | 6,231,772 | 6,274,056 | 6,290,861 | 6,248,248 | 6,306,671 |
| 6,331,258 | 6,110,754 | 6,294,101 | 6,416,679 | 6,264,849 | 6,254,793 | 6,245,246 |

-continued

| | | | | | | |
|---|---|---|---|---|---|---|
| 6,855,264 | 6,235,211 | 6,491,833 | 6,264,850 | 6,258,284 | 6,312,615 | 6,228,668 |
| 6,180,427 | 6,171,875 | 6,267,904 | 6,245,247 | 6,315,914 | 7,169,316 | 6,526,658 |
| 7,210,767 | 11/056,146 | 11/635,523 | 6,665,094 | 6,450,605 | 6,512,596 | 6,654,144 |
| 7,125,090 | 6,687,022 | 7,072,076 | 7,092,125 | 7,215,443 | 7,136,195 | 7,077,494 |
| 6,877,834 | 6,969,139 | 10/636,227 | 7,283,280 | 6,912,067 | 7,277,205 | 7,154,637 |
| 10/636,230 | 7,070,251 | 6,851,782 | 10/636,211 | 10/636,247 | 6,843,545 | 7,079,286 |
| 7,064,867 | 7,065,247 | 7,027,177 | 7,218,415 | 7,064,873 | 6,954,276 | 7,061,644 |
| 7,092,127 | 7,059,695 | 10/990,382 | 7,177,052 | 7,270,394 | 11/124,231 | 7,188,921 |
| 7,187,469 | 7,196,820 | 11/281,445 | 7,283,281 | 7,251,051 | 7,245,399 | 11/524,911 |
| 11/640,267 | 11/706,297 | 11/730,387 | 11/737,142 | 11/764,729 | 11/834,637 | 11/853,019 |
| 11/863,239 | 11/305,274 | 11/305,273 | 11/305,275 | 11/305,152 | 11/305,158 | 11/305,008 |
| 6,231,148 | 6,293,658 | 6,614,560 | 6,238,033 | 6,312,070 | 6,238,111 | 6,378,970 |
| 6,196,739 | 6,270,182 | 6,152,619 | 7,006,143 | 6,876,394 | 6,738,096 | 6,970,186 |
| 6,287,028 | 6,412,993 | 11/033,145 | 11/102,845 | 11/102,861 | 11/248,421 | 11/672,878 |
| 7,204,941 | 7,282,164 | 10/815,628 | 11,845,672 | 7,278,727 | 10/913,373 | 10/913,374 |
| 10/913,372 | 7,138,391 | 7,153,956 | 10/913,380 | 10/913,379 | 10/913,376 | 7,122,076 |
| 7,148,345 | 11/172,816 | 11/172,815 | 11/172,814 | 11/482,990 | 11/482,986 | 11/482,985 |
| 11/454,899 | 11/583,942 | 11/592,990 | 11,849,360 | 11/831,961 | 11/831,962 | 11/831,963 |
| 60,951,700 | 11/832,629 | 11/832,637 | 60,971,535 | 10/407,212 | 7,252,366 | 10/683,064 |
| 10/683,041 | 7,275,811 | 10/884,889 | 10/922,890 | 10/922,875 | 10/922,885 | 10/922,889 |
| 10/922,884 | 10/922,879 | 10/922,887 | 10/922,888 | 10/922,874 | 7,234,795 | 10/922,871 |
| 10/922,880 | 7,293,855 | 10/922,882 | 10/922,883 | 10/922,878 | 10/922,872 | 10/922,876 |
| 10/922,886 | 10/922,877 | 7,147,792 | 7,175,774 | 11/159,193 | 11/491,378 | 11,766,713 |
| 11/841,647 | 11/482,980 | 11/563,684 | 11/482,967 | 11/482,966 | 11/482,988 | 11/482,989 |
| 11/293,832 | 11/293,838 | 11/293,825 | 11/293,841 | 11/293,799 | 11/293,796 | 11/293,797 |
| 11/293,798 | 11/124,158 | 11/124,196 | 11/124,199 | 11/124,162 | 11/124,202 | 11/124,197 |
| 11/124,154 | 11/124,198 | 7,284,921 | 11/124,151 | 11/124,160 | 11/124,192 | 11/124,175 |
| 11/124,163 | 11/124,149 | 11/124,152 | 11/124,173 | 11/124,155 | 7,236,271 | 11/124,174 |
| 11/124,194 | 11/124,164 | 11/124,200 | 11/124,195 | 11/124,166 | 11/124,150 | 11/124,172 |
| 11/124,165 | 11/124,186 | 11/124,185 | 11/124,184 | 11/124,182 | 11/124,201 | 11/124,171 |
| 11/124,181 | 11/124,161 | 11/124,156 | 11/124,191 | 11/124,159 | 11/124,176 | 11/124,188 |
| 11/124,170 | 11/124,187 | 11/124,189 | 11/124,190 | 11/124,180 | 11/124,193 | 11/124,183 |
| 11/124,178 | 11/124,177 | 11/124,148 | 11/124,168 | 11/124,167 | 11/124,179 | 11/124,169 |
| 11/187,976 | 11/188,011 | 11/188,014 | 11/482,979 | 11/735,490 | 11/853,018 | 11/944,450 |
| 11/228,540 | 11/228,500 | 11/228,501 | 11/228,530 | 11/228,490 | 11/228,531 | 11/228,504 |
| 11/228,533 | 11/228,502 | 11/228,507 | 11/228,482 | 11/228,505 | 11/228,497 | 11/228,487 |
| 11/228,529 | 11/228,484 | 11/228,489 | 11/228,518 | 11/228,536 | 11/228,496 | 11/228,488 |
| 11/228,506 | 11/228,516 | 11/228,526 | 11/228,539 | 11/228,538 | 11/228,524 | 11/228,523 |
| 11/228,519 | 11/228,528 | 11/228,527 | 11/228,525 | 11/228,520 | 11/228,498 | 11/228,511 |
| 11/228,522 | 11/228,515 | 11/228,537 | 11/228,534 | 11/228,491 | 11/228,499 | 11/228,509 |
| 11/228,492 | 11/228,493 | 11/228,510 | 11/228,508 | 11/228,512 | 11/228,514 | 11/228,494 |
| 11/228,495 | 11/228,486 | 11/228,481 | 11/228,477 | 11/228,485 | 11/228,483 | 11/228,521 |
| 11/228,517 | 11/228,532 | 11/228,513 | 11/228,503 | 11/228,480 | 11/228,535 | 11/228,478 |
| 11/228,479 | 6,238,115 | 6,386,535 | 6,398,344 | 6,612,240 | 6,752,549 | 6,805,049 |
| 6,971,313 | 6,899,480 | 6,860,664 | 6,925,935 | 6,966,636 | 7,024,995 | 7,284,852 |
| 6,926,455 | 7,056,038 | 6,869,172 | 7,021,843 | 6,988,845 | 6,964,533 | 6,981,809 |
| 7,284,822 | 7,258,067 | 11/155,544 | 7,222,941 | 7,284,925 | 7,278,795 | 7,249,904 |
| 11/737,726 | 11,772,240 | 11/863,246 | 11/863,145 | 11/865,650 | 6,087,638 | 6,340,222 |
| 6,041,600 | 6,299,300 | 6,067,797 | 6,286,935 | 6,044,646 | 6,382,769 | 6,787,051 |
| 6,938,990 | 11/242,916 | 11/144,799 | 11/198,235 | 11,861,282 | 11,861,284 | 11/766,052 |
| 7,152,972 | 11/592,996 | D529952 | 6,390,605 | 6,322,195 | 6,612,110 | 6,480,089 |
| 6,460,778 | 6,305,788 | 6,426,014 | 6,364,453 | 6,457,795 | 6,315,399 | 6,338,548 |
| 7,040,736 | 6,938,992 | 6,994,425 | 6,863,379 | 6,540,319 | 6,994,421 | 6,984,019 |
| 7,008,043 | 6,997,544 | 6,328,431 | 6,991,310 | 10/965,772 | 7,140,723 | 6,328,425 |
| 6,982,184 | 7,267,423 | 7,134,741 | 7,066,577 | 7,152,945 | 11/038,200 | 7,021,744 |
| 6,991,320 | 7,155,911 | 11/107,799 | 6,595,624 | 7,152,943 | 7,125,103 | 11/209,709 |
| 7,290,857 | 7,285,437 | 7,229,151 | 11/330,058 | 7,237,873 | 11/329,163 | 11/442,180 |
| 11/450,431 | 7,213,907 | 6,417,757 | 11/482,951 | 11/545,566 | 11/583,826 | 11/604,315 |
| 11/604,323 | 11/643,845 | 11/706,950 | 11/730,399 | 11,749,121 | 11/753,549 | 11/834,630 |
| 11/935,389 | 11/869,670 | 7,095,309 | 11/945,157 | 11,957,473 | 11,967,235 | 6,854,825 |
| 6,623,106 | 6,672,707 | 6,575,561 | 6,817,700 | 6,588,885 | 7,075,677 | 6,428,139 |
| 6,575,549 | 6,846,692 | 6,425,971 | 7,063,993 | 6,383,833 | 6,955,414 | 6,412,908 |
| 6,746,105 | 6,953,236 | 6,412,904 | 7,128,388 | 6,398,343 | 6,652,071 | 6,793,323 |
| 6,659,590 | 6,676,245 | 7,201,460 | 6,464,332 | 6,659,593 | 6,478,406 | 6,978,613 |
| 6,439,693 | 6,502,306 | 6,966,111 | 6,863,369 | 6,428,142 | 6,874,868 | 6,390,591 |
| 6,799,828 | 6,896,358 | 7,018,016 | 10/296,534 | 6,328,417 | 6,322,194 | 6,382,779 |
| 6,629,745 | 6,565,193 | 6,609,786 | 6,609,787 | 6,439,908 | 6,684,503 | 6,843,551 |
| 6,764,166 | 6,561,617 | 10/510,092 | 6,557,970 | 6,546,628 | 10/510,098 | 6,652,074 |
| 6,820,968 | 7,175,260 | 6,682,174 | 7,303,262 | 6,648,453 | 6,834,932 | 6,682,176 |
| 6,998,062 | 6,767,077 | 7,278,717 | 6,755,509 | 10/534,813 | 6,692,108 | 10/534,811 |
| 6,672,709 | 7,303,263 | 7,086,718 | 10/534,881 | 6,672,710 | 10/534,812 | 6,669,334 |
| 10/534,804 | 7,152,958 | 7,281,782 | 6,824,246 | 7,264,336 | 6,669,333 | 10/534,815 |
| 6,820,967 | 7,306,326 | 6,736,489 | 7,264,335 | 6,719,406 | 7,222,943 | 7,188,419 |
| 7,168,166 | 6,974,209 | 7,086,719 | 6,974,210 | 7,195,338 | 7,252,775 | 7,101,025 |
| 11/474,281 | 11/485,258 | 11/706,304 | 11/706,324 | 11/706,326 | 11/706,321 | 11/772,239 |
| 11/782,598 | 11/829,941 | 11/852,991 | 11,852,986 | 11/936,062 | 11/934,027 | 11,955,028 |
| 11/763,440 | 11/763,442 | 11/246,687 | 11/246,718 | 11/246,685 | 11/246,686 | 11/246,703 |
| 11/246,691 | 11/246,711 | 11/246,690 | 11/246,712 | 11/246,717 | 11/246,709 | 11/246,700 |
| 11/246,701 | 11/246,702 | 11/246,668 | 11/246,697 | 11/246,698 | 11/246,699 | 11/246,675 |

-continued

| | | | | | | |
|---|---|---|---|---|---|---|
| 11/246,674 | 11/246,667 | 11/829,957 | 11/829,960 | 11/829,961 | 11/829,962 | 11/829,963 |
| 11/829,966 | 11/829,967 | 11/829,968 | 11/829,969 | 11,946,839 | 11,946,838 | 11,946,837 |
| 11,951,230 | 7,156,508 | 7,159,972 | 7,083,271 | 7,165,834 | 7,080,894 | 7,201,469 |
| 7,090,336 | 7,156,489 | 10/760,233 | 10/760,246 | 7,083,257 | 7,258,422 | 7,255,423 |
| 7,219,980 | 10/760,253 | 10/760,255 | 10/760,209 | 7,118,192 | 10/760,194 | 10/760,238 |
| 7,077,505 | 7,198,354 | 7,077,504 | 10/760,189 | 7,198,355 | 10/760,232 | 10/760,231 |
| 7,152,959 | 7,213,906 | 7,178,901 | 7,222,938 | 7,108,353 | 7,104,629 | 11/446,227 |
| 11/454,904 | 11/472,345 | 11/474,273 | 7,261,401 | 11/474,279 | 11/482,939 | 11/482,950 |
| 11/499,709 | 7,306,324 | 7,306,325 | 11/603,824 | 11/601,756 | 11/601,672 | 7,303,261 |
| 11/653,253 | 11/706,328 | 11/706,299 | 11/706,965 | 11/737,080 | 11/737,041 | 11/778,062 |
| 11/778,566 | 11/782,593 | 11/934,018 | 11/945,157 | 11,951,095 | 11,951,828 | 11,954,906 |
| 11,954,949 | 11,967,226 | 7,303,930 | 11/246,672 | 11/246,673 | 11/246,683 | 11/246,682 |
| 60/939,086 | 11,860,538 | 11,860,539 | 11/860,540 | 11,860,541 | 11,860,542 | 11/936,060 |
| 11,877,667 | 11,877,668 | 7,246,886 | 7,128,400 | 7,108,355 | 6,991,322 | 7,287,836 |
| 7,118,197 | 10/728,784 | 10/728,783 | 7,077,493 | 6,962,402 | 10/728,803 | 7,147,308 |
| 10/728,779 | 7,118,198 | 7,168,790 | 7,172,270 | 7,229,155 | 6,830,318 | 7,195,342 |
| 7,175,261 | 10/773,183 | 7,108,356 | 7,118,202 | 10/773,186 | 7,134,744 | 10/773,185 |
| 7,134,743 | 7,182,439 | 7,210,768 | 10/773,187 | 7,134,745 | 7,156,484 | 7,118,201 |
| 7,111,926 | 10/773,184 | 7,018,021 | 11/060,751 | 11/060,805 | 11/188,017 | 7,128,402 |
| 11/298,774 | 11/329,157 | 11/490,041 | 11/501,767 | 7,284,839 | 7,246,885 | 7,229,156 |
| 11/505,846 | 11/505,857 | 7,293,858 | 11/524,908 | 11/524,938 | 7,258,427 | 11/524,912 |
| 7,278,716 | 11/592,995 | 11/603,825 | 11/649,773 | 11/650,549 | 11/653,237 | 11/706,378 |
| 11/706,962 | 11,749,118 | 11/754,937 | 11,749,120 | 11/744,885 | 11/779,850 | 11/765,439 |
| 11/842,950 | 11/839,539 | 11/926,121 | 11/097,308 | 11/097,309 | 7,246,876 | 11/097,299 |
| 11/097,310 | 11/097,213 | 11/210,687 | 11/097,212 | 7,147,306 | 7,261,394 | 11/764,806 |
| 11/782,595 | 11,965,696 | 11/482,953 | 11/482,977 | 11/544,778 | 11/544,779 | 11/764,808 |
| 11/756,624 | 11/756,625 | 11/756,626 | 11/756,627 | 11/756,628 | 11/756,629 | 11/756,630 |
| 11/756,631 | 7,156,289 | 7,178,718 | 7,225,979 | 11/712,434 | 11/084,796 | 11/084,742 |
| 11/084,806 | 09/575,197 | 09/575,197 | 7,079,712 | 7,079,712 | 6,825,945 | 6,825,945 |
| 09/575,165 | 09/575,165 | 6,813,039 | 6,813,039 | 7,190,474 | 7,190,474 | 6,987,506 |
| 6,987,506 | 6,824,044 | 6,824,044 | 7,038,797 | 7,038,797 | 6,980,318 | 6,980,318 |
| 6,816,274 | 6,816,274 | 7,102,772 | 7,102,772 | 09/575,186 | 09/575,186 | 6,681,045 |
| 6,681,045 | 6,678,499 | 6,678,499 | 6,679,420 | 6,679,420 | 6,963,845 | 6,963,845 |
| 6,976,220 | 6,976,220 | 6,728,000 | 6,728,000 | 7,110,126 | 7,110,126 | 7,173,722 |
| 7,173,722 | 6,976,035 | 6,976,035 | 6,813,558 | 6,813,558 | 6,766,942 | 6,766,942 |
| 6,965,454 | 6,965,454 | 6,995,859 | 6,995,859 | 7,088,459 | 7,088,459 | 6,720,985 |
| 6,720,985 | 7,286,113 | 7,286,113 | 6,922,779 | 6,922,779 | 6,978,019 | 6,978,019 |
| 6,847,883 | 6,847,883 | 7,131,058 | 7,131,058 | 7,295,839 | 7,295,839 | 09/607,843 |
| 09/607,843 | 09/693,690 | 09/693,690 | 6,959,298 | 6,959,298 | 6,973,450 | 6,973,450 |
| 7,150,404 | 7,150,404 | 6,965,882 | 6,965,882 | 7,233,924 | 7,233,924 | 09/575,181 |
| 09/575,181 | 09/722,174 | 09/722,174 | 7,175,079 | 7,175,079 | 7,162,259 | 6,718,061 |
| 10/291,523 | 10/291,471 | 7,012,710 | 6,825,956 | 10/291,481 | 7,222,098 | 10/291,825 |
| 7,263,508 | 7,031,010 | 6,972,864 | 6,862,105 | 7,009,738 | 6,989,911 | 6,982,807 |
| 10/291,576 | 6,829,387 | 6,714,678 | 6,644,545 | 6,609,653 | 6,651,879 | 10/291,555 |
| 7,293,240 | 10/291,592 | 10/291,542 | 7,044,363 | 7,004,390 | 6,867,880 | 7,034,953 |
| 6,987,581 | 7,216,224 | 10/291,821 | 7,162,269 | 7,162,222 | 7,290,210 | 7,293,233 |
| 7,293,234 | 6,850,931 | 6,865,570 | 6,847,961 | 10/685,523 | 10/685,583 | 7,162,442 |
| 10/685,584 | 7,159,784 | 10/804,034 | 10/793,933 | 6,889,896 | 10/831,232 | 7,174,056 |
| 6,996,274 | 7,162,088 | 10/943,874 | 10/943,872 | 10/944,044 | 7,259,884 | 10/944,043 |
| 7,167,270 | 10/943,877 | 6,986,459 | 10/954,170 | 7,181,448 | 10/981,626 | 10/981,616 |
| 10/981,627 | 7,231,293 | 7,174,329 | 10/992,713 | 7,295,922 | 7,200,591 | 11/020,106 |
| 11/020,260 | 11/020,321 | 11/020,319 | 11/026,045 | 11/059,696 | 11/051,032 | 11/059,674 |
| 11/107,944 | 11/107,941 | 11/082,940 | 11/082,815 | 11/082,827 | 11/082,829 | 6,991,153 |
| 6,991,154 | 11/124,256 | 11/123,136 | 11/154,676 | 11/159,196 | 11/182,002 | 11/202,251 |
| 11/202,252 | 11/202,253 | 11/203,200 | 11/202,218 | 11/206,778 | 11/203,424 | 11/222,977 |
| 11/228,450 | 11/227,239 | 11/286,334 | 7,225,402 | 11/329,187 | 11/349,143 | 11/491,225 |
| 11/491,121 | 11/442,428 | 11/454,902 | 11/442,385 | 11/478,590 | 7,271,931 | 11/520,170 |
| 11/603,057 | 11/706,964 | 11/739,032 | 11,739,014 | 11/834,633 | 11/830,848 | 11/830,849 |
| 11/839,542 | 11/866,394 | 11/934,077 | 11,951,874 | 7,068,382 | 7,068,382 | 7,007,851 |
| 7,007,851 | 6,957,921 | 6,957,921 | 6,457,883 | 6,457,883 | 10/743,671 | 7,044,381 |
| 11/203,205 | 7,094,910 | 7,091,344 | 7,122,685 | 7,038,066 | 7,099,019 | 7,062,651 |
| 7,062,651 | 6,789,194 | 6,789,194 | 6,789,191 | 6,789,191 | 10/900,129 | 7,278,018 |
| 10/913,350 | 10/982,975 | 10/983,029 | 11/331,109 | 6,644,642 | 6,644,642 | 6,502,614 |
| 6,502,614 | 6,622,999 | 6,622,999 | 6,669,385 | 6,669,385 | 6,827,116 | 7,011,128 |
| 10/949,307 | 6,549,935 | 6,549,935 | 6,987,573 | 6,987,573 | 6,727,996 | 6,727,996 |
| 6,591,884 | 6,591,884 | 6,439,706 | 6,439,706 | 6,760,119 | 6,760,119 | 7,295,332 |
| 7,295,332 | 7,064,851 | 7,064,851 | 6,826,547 | 6,826,547 | 6,290,349 | 6,290,349 |
| 6,428,155 | 6,428,155 | 6,785,016 | 6,785,016 | 6,831,682 | 6,831,682 | 6,741,871 |
| 6,741,871 | 6,927,871 | 6,927,871 | 6,980,306 | 6,980,306 | 6,965,439 | 6,965,439 |
| 6,840,606 | 7,036,918 | 6,977,746 | 6,970,264 | 7,068,389 | 7,093,991 | 7,190,491 |
| 10/901,154 | 10/932,044 | 10/962,412 | 7,177,054 | 10/962,552 | 10/965,733 | 10/965,933 |
| 10/974,742 | 10/982,974 | 7,180,609 | 10/986,375 | 11/107,817 | 7,292,363 | 11/149,160 |
| 11/206,756 | 11/250,465 | 7,202,959 | 11/653,219 | 11/706,309 | 11/730,389 | 11/730,392 |
| 60/953,443 | 11/866,387 | 60,974,077 | 6,982,798 | 6,982,798 | 6,870,966 | 6,870,966 |
| 6,822,639 | 6,822,639 | 6,474,888 | 6,474,888 | 6,627,870 | 6,627,870 | 6,724,374 |
| 6,724,374 | 6,788,982 | 6,788,982 | 7,263,270 | 7,263,270 | 6,788,293 | 6,788,293 |
| 6,946,672 | 6,946,672 | 6,737,591 | 6,737,591 | 7,091,960 | 7,091,960 | 09/693,514 |
| 09/693,514 | 6,792,165 | 6,792,165 | 7,105,753 | 7,105,753 | 6,795,593 | 6,980,704 |
| 6,768,821 | 7,132,612 | 7,041,916 | 6,797,895 | 7,015,901 | 7,289,882 | 7,148,644 |

-continued

| | | | | | | |
|---|---|---|---|---|---|---|
| 10/778,056 | 10/778,058 | 10/778,060 | 10/778,059 | 10/778,063 | 10/778,062 | 10/778,061 |
| 10/778,057 | 7,096,199 | 7,286,887 | 10/917,467 | 10/917,466 | 10/917,465 | 7,218,978 |
| 7,245,294 | 7,277,085 | 7,187,370 | 10/917,436 | 10/943,856 | 10/919,379 | 7,019,319 |
| 10/943,878 | 10/943,849 | 7,043,096 | 7,148,499 | 11/144,840 | 11/155,556 | 11/155,557 |
| 11/193,481 | 11/193,435 | 11/193,482 | 11/193,479 | 11/255,941 | 11/281,671 | 11/298,474 |
| 7,245,760 | 11/488,832 | 11/495,814 | 11/495,823 | 11/495,822 | 11/495,821 | 11/495,820 |
| 11/653,242 | 11/754,370 | 60,911,260 | 11/829,936 | 11/839,494 | 11,866,305 | 11,866,313 |
| 11,866,324 | 11,866,336 | 11,866,348 | 11,866,359 | 11,970,951 | 7,055,739 | 7,055,739 |
| 7,233,320 | 7,233,320 | 6,830,196 | 6,830,196 | 6,832,717 | 6,832,717 | 7,182,247 |
| 7,182,247 | 7,120,853 | 7,082,562 | 6,843,420 | 10/291,718 | 6,789,731 | 7,057,608 |
| 6,766,944 | 6,766,945 | 7,289,103 | 10/291,559 | 7,299,969 | 7,264,173 | 10/409,864 |
| 7,108,192 | 10/537,159 | 7,111,791 | 7,077,333 | 6,983,878 | 10/786,631 | 7,134,598 |
| 10/893,372 | 6,929,186 | 6,994,264 | 7,017,826 | 7,014,123 | 7,134,601 | 7,150,396 |
| 10/971,146 | 7,017,823 | 7,025,276 | 7,284,701 | 7,080,780 | 11/074,802 | 11/442,366 |
| 11,749,158 | 11/842,948 | 10/492,169 | 10/492,152 | 10/492,168 | 10/492,161 | 7,308,148 |
| 10/502,575 | 10/531,229 | 10/683,151 | 10/531,733 | 10/683,040 | 10/510,391 | 10/919,260 |
| 10/510,392 | 10/778,090 | 11/944,404 | 11/936,638 | 6,957,768 | 6,957,768 | 09/575,172 |
| 09/575,172 | 7,170,499 | 7,170,499 | 7,106,888 | 7,106,888 | 7,123,239 | 7,123,239 |
| 6,982,701 | 6,982,703 | 7,227,527 | 6,786,397 | 6,947,027 | 6,975,299 | 7,139,431 |
| 7,048,178 | 7,118,025 | 6,839,053 | 7,015,900 | 7,010,147 | 7,133,557 | 6,914,593 |
| 10/291,546 | 6,938,826 | 7,278,566 | 7,123,245 | 6,992,662 | 7,190,346 | 11/074,800 |
| 11/074,782 | 11/074,777 | 11/075,917 | 7,221,781 | 11/102,843 | 7,213,756 | 11/188,016 |
| 7,180,507 | 7,263,225 | 7,287,688 | 11/737,094 | 11/753,570 | 11/782,596 | 11/865,711 |
| 11,856,061 | 11,856,062 | 11,856,064 | 11,856,066 | 11/672,522 | 11/672,950 | 11/672,947 |
| 11/672,891 | 11/672,954 | 11/672,533 | 11,754,310 | 11/754,321 | 11/754,320 | 11/754,319 |
| 11/754,318 | 11/754,317 | 11/754,316 | 11/754,315 | 11/754,314 | 11/754,313 | 11/754,312 |
| 11/754,311 | 6,593,166 | 6,593,166 | 7,132,679 | 6,940,088 | 7,119,357 | 7,307,272 |
| 6,755,513 | 6,974,204 | 6,409,323 | 7,055,930 | 6,281,912 | 6,893,109 | 6,604,810 |
| 6,824,242 | 6,318,920 | 7,210,867 | 6,488,422 | 6,655,786 | 6,457,810 | 6,485,135 |
| 6,796,731 | 6,904,678 | 6,641,253 | 7,125,106 | 6,786,658 | 7,097,273 | 6,824,245 |
| 7,222,947 | 6,918,649 | 6,860,581 | 6,929,351 | 7,063,404 | 6,969,150 | 7,004,652 |
| 6,871,938 | 6,905,194 | 6,846,059 | 6,997,626 | 10/974,881 | 7,029,098 | 6,966,625 |
| 7,114,794 | 7,207,646 | 7,077,496 | 7,284,831 | 11/072,529 | 7,152,938 | 7,182,434 |
| 7,182,430 | 7,306,317 | 7,032,993 | 11/155,513 | 11/155,545 | 11/144,813 | 7,172,266 |
| 7,258,430 | 7,128,392 | 7,210,866 | 7,306,322 | 11/505,933 | 11/540,727 | 11/635,480 |
| 11/707,946 | 11/706,303 | 11/709,084 | 11/730,776 | 11/744,143 | 11/779,845 | 11/782,589 |
| 11/863,256 | 11/940,302 | 11/940,235 | 11,955,359 | 11/066,161 | 11/066,160 | 11/066,159 |
| 11/066,158 | 7,287,831 | 11/875,936 | 6,804,030 | 6,807,315 | 6,771,811 | 6,683,996 |
| 7,271,936 | 7,304,771 | 6,965,691 | 7,058,219 | 7,289,681 | 7,187,807 | 7,181,063 |
| 11/338,783 | 11/603,823 | 11/650,536 | 10/727,181 | 10/727,162 | 10/727,163 | 10/727,245 |
| 7,121,639 | 7,165,824 | 7,152,942 | 10/727,157 | 7,181,572 | 7,096,137 | 7,302,592 |
| 7,278,034 | 7,188,282 | 10/727,159 | 10/727,180 | 10/727,179 | 10/727,192 | 10/727,274 |
| 10/727,164 | 10/727,161 | 10/727,198 | 10/727,158 | 10/754,536 | 10/754,938 | 10/727,227 |
| 10/727,160 | 10/934,720 | 7,171,323 | 7,278,697 | 11/442,131 | 11/474,278 | 11/488,853 |
| 11/488,841 | 11,749,750 | 11,749,749 | 11,955,127 | 11,951,213 | 10/296,522 | 6,795,215 |
| 7,070,098 | 7,154,638 | 6,805,419 | 6,859,289 | 6,977,751 | 6,398,332 | 6,394,573 |
| 6,622,923 | 6,747,760 | 6,921,144 | 10/884,881 | 7,092,112 | 7,192,106 | 11/039,866 |
| 7,173,739 | 6,986,560 | 7,008,033 | 11/148,237 | 7,222,780 | 7,270,391 | 7,150,510 |
| 11/478,599 | 11/499,749 | 11/521,388 | 11/738,518 | 11/482,981 | 11/743,662 | 11/743,661 |
| 11/743,659 | 11/743,655 | 11/743,657 | 11/752,900 | 11,926,109 | 11/927,163 | 11,929,567 |
| 7,195,328 | 7,182,422 | 11/650,537 | 11/712,540 | 10/854,521 | 10/854,522 | 10/854,488 |
| 7,281,330 | 10/854,503 | 10/854,504 | 10/854,509 | 7,188,928 | 7,093,989 | 10/854,497 |
| 10/854,495 | 10/854,498 | 10/854,511 | 10/854,512 | 10/854,525 | 10/854,526 | 10/854,516 |
| 7,252,353 | 10/854,515 | 7,267,417 | 10/854,505 | 10/854,493 | 7,275,805 | 7,314,261 |
| 10/854,490 | 7,281,777 | 7,290,852 | 10/854,528 | 10/854,523 | 10/854,527 | 10/854,524 |
| 10/854,520 | 10/854,514 | 10/854,519 | 10/854,513 | 10/854,499 | 10/854,501 | 7,266,661 |
| 7,243,193 | 10/854,518 | 10/854,517 | 10/934,628 | 7,163,345 | 11/499,803 | 11/601,757 |
| 11/706,295 | 11/735,881 | 11,748,483 | 11,749,123 | 11/766,061 | 11,775,135 | 11,772,235 |
| 11/778,569 | 11/829,942 | 11/870,342 | 11/935,274 | 11/937,239 | 11,961,907 | 11,961,940 |
| 11,961,961 | 11/014,731 | D529081 | D541848 | D528597 | 6,924,907 | 6,712,452 |
| 6,416,160 | 6,238,043 | 6,958,826 | 6,812,972 | 6,553,459 | 6,967,741 | 6,956,669 |
| 6,903,766 | 6,804,026 | 7,259,889 | 6,975,429 | 10/636,234 | 10/636,233 | 7,301,567 |
| 10/636,216 | 7,274,485 | 7,139,084 | 7,173,735 | 7,068,394 | 7,286,182 | 7,086,644 |
| 7,250,977 | 7,146,281 | 7,023,567 | 7,136,183 | 7,083,254 | 6,796,651 | 7,061,643 |
| 7,057,758 | 6,894,810 | 6,995,871 | 7,085,010 | 7,092,126 | 7,123,382 | 7,061,650 |
| 10/853,143 | 6,986,573 | 6,974,212 | 7,307,756 | 7,173,737 | 10/954,168 | 7,246,868 |
| 11/065,357 | 7,137,699 | 11/107,798 | 7,148,994 | 7,077,497 | 11/176,372 | 7,248,376 |
| 11/225,158 | 7,306,321 | 7,173,729 | 11/442,132 | 11/478,607 | 11/503,085 | 11/545,502 |
| 11/583,943 | 11/585,946 | 11/653,239 | 11/653,238 | 11/764,781 | 11/764,782 | 11/779,884 |
| 11,845,666 | 11/872,637 | 11/944,401 | 11/940,215 | 11/544,764 | 11/544,765 | 11/544,772 |
| 11/544,773 | 11/544,774 | 11/544,775 | 11/544,776 | 11/544,766 | 11/544,767 | 11/544,771 |
| 11/544,770 | 11/544,769 | 11/544,777 | 11/544,768 | 11/544,763 | 11/293,804 | 11/293,840 |
| 11/293,803 | 11/293,833 | 11/293,834 | 11/293,835 | 11/293,836 | 11/293,837 | 11/293,792 |
| 11/293,794 | 11/293,839 | 11/293,826 | 11/293,829 | 11/293,830 | 11/293,827 | 11/293,828 |
| 7,270,494 | 11/293,823 | 11/293,824 | 11/293,831 | 11/293,815 | 11/293,819 | 11/293,818 |
| 11/293,817 | 11/293,816 | 11/838,875 | 11/482,978 | 11/640,356 | 11/640,357 | 11/640,358 |
| 11/640,359 | 11/640,360 | 11/640,355 | 11/679,786 | 11/872,714 | 10/760,254 | 10/760,210 |
| 10/760,202 | 7,201,468 | 10/760,198 | 10/760,249 | 7,234,802 | 7,303,255 | 7,287,846 |
| 7,156,511 | 10/760,264 | 7,258,432 | 7,097,291 | 10/760,222 | 10/760,248 | 7,083,273 |

-continued

| | | | | | | |
|---|---|---|---|---|---|---|
| 10/760,192 | 10/760,203 | 10/760,204 | 10/760,205 | 10/760,206 | 10/760,267 | 10/760,270 |
| 7,198,352 | 10/760,271 | 7,303,251 | 7,201,470 | 7,121,655 | 7,293,861 | 7,232,208 |
| 10/760,186 | 10/760,261 | 7,083,272 | 7,261,400 | 11/474,272 | 11/474,315 | 7,311,387 |
| 11/583,874 | 7,303,258 | 11/706,322 | 11/706,968 | 11/749,119 | 11,749,157 | 11,779,848 |
| 11/782,590 | 11/855,152 | 11,855,151 | 11/870,327 | 11/934,780 | 11/935,992 | 11,951,193 |
| 11/014,764 | 11/014,763 | 11/014,748 | 11/014,747 | 11/014,761 | 11/014,760 | 11/014,757 |
| 7,303,252 | 7,249,822 | 11/014,762 | 11/014,724 | 11/014,723 | 11/014,756 | 11/014,736 |
| 11/014,759 | 11/014,758 | 11/014,725 | 11/014,739 | 11/014,738 | 11/014,737 | 11/014,726 |
| 11/014,745 | 11/014,712 | 7,270,405 | 7,303,268 | 11/014,735 | 11/014,734 | 11/014,719 |
| 11/014,750 | 11/014,749 | 7,249,833 | 11/758,640 | 11/775,143 | 11/838,877 | 11,944,453 |
| 11/944,633 | 11,955,065 | 11/014,769 | 11/014,729 | 11/014,743 | 11/014,733 | 7,300,140 |
| 11/014,755 | 11/014,765 | 11/014,766 | 11/014,740 | 7,284,816 | 7,284,845 | 7,255,430 |
| 11/014,744 | 11/014,741 | 11/014,768 | 11/014,767 | 11/014,718 | 11/014,717 | 11/014,716 |
| 11/014,732 | 11/014,742 | 11/097,268 | 11/097,185 | 11/097,184 | 11/778,567 | 11,852,958 |
| 11,852,907 | 11/872,038 | 11,955,093 | 11,961,578 | 11/293,820 | 11/293,813 | 11/293,822 |
| 11/293,812 | 11/293,821 | 11/293,814 | 11/293,793 | 11/293,842 | 11/293,811 | 11/293,807 |
| 11/293,806 | 11/293,805 | 11/293,810 | 11/688,863 | 11/688,864 | 11/688,865 | 11/688,866 |
| 11/688,867 | 11/688,868 | 11/688,869 | 11/688,871 | 11/688,872 | 11/688,873 | 11/741,766 |
| 11/482,982 | 11/482,983 | 11/482,984 | 11/495,818 | 11/495,819 | 11/677,049 | 11/677,050 |
| 11/677,051 | 11,872,719 | 11,872,718 | 7,306,320 | 11/934,781 | D528156 | 10/760,180 |
| 7,111,935 | 10/760,213 | 10/760,219 | 10/760,237 | 7,261,482 | 10/760,220 | 7,002,664 |
| 10/760,252 | 10/760,265 | 7,088,420 | 11/446,233 | 11/503,083 | 11/503,081 | 11/516,487 |
| 11/599,312 | 6,364,451 | 6,533,390 | 6,454,378 | 7,224,478 | 6,559,969 | 6,896,362 |
| 7,057,760 | 6,982,799 | 11/202,107 | 11/743,672 | 11,744,126 | 11/743,673 | 7,093,494 |
| 7,143,652 | 7,089,797 | 7,159,467 | 7,234,357 | 7,124,643 | 7,121,145 | 7,089,790 |
| 7,194,901 | 6,968,744 | 7,089,798 | 7,240,560 | 7,137,302 | 11/442,177 | 7,171,855 |
| 7,260,995 | 7,260,993 | 7,165,460 | 7,222,538 | 7,258,019 | 11/543,047 | 7,258,020 |
| 11/604,324 | 11/642,520 | 11/706,305 | 11/707,056 | 11,744,211 | 11/767,526 | 11/779,846 |
| 11/764,227 | 11/829,943 | 11/829,944 | 6,454,482 | 6,454,482 | 6,808,330 | 6,808,330 |
| 6,527,365 | 6,527,365 | 6,474,773 | 6,474,773 | 6,550,997 | 6,550,997 | 7,093,923 |
| 6,957,923 | 7,131,724 | 10/949,288 | 7,168,867 | 7,125,098 | 11/706,966 | 11/185,722 |
| 7,249,901 | 7,188,930 | 11/014,728 | 11/014,727 | D536031 | D531214 | 7,237,888 |
| 7,168,654 | 7,201,272 | 6,991,098 | 7,217,051 | 6,944,970 | 10/760,215 | 7,108,434 |
| 10/760,257 | 7,210,407 | 7,186,042 | 10/760,266 | 6,920,704 | 7,217,049 | 10/760,214 |
| 10/760,260 | 7,147,102 | 7,287,828 | 7,249,838 | 10/760,241 | 10/962,413 | 10/962,427 |
| 7,261,477 | 7,225,739 | 10/962,402 | 10/962,425 | 10/962,428 | 7,191,978 | 10/962,426 |
| 10/962,409 | 10/962,417 | 10/962,403 | 7,163,287 | 7,258,415 | 10/962,523 | 7,258,424 |
| 10/962,410 | 7,195,412 | 7,207,670 | 7,270,401 | 7,220,072 | 11/474,267 | 11/544,547 |
| 11/585,925 | 11/593,000 | 11/706,298 | 11/706,296 | 11/706,327 | 11/730,760 | 11/730,407 |
| 11/730,787 | 11/735,977 | 11/736,527 | 11/753,566 | 11/754,359 | 11/778,061 | 11/765,398 |
| 11/778,556 | 11/829,937 | 11/780,470 | 11/866,399 | 11/223,262 | 11/223,018 | 11/223,114 |
| 11,955,366 | 11/223,022 | 11/223,021 | 11/223,020 | 11/223,019 | 11/014,730 | D541849 |
| 29/279,123 | 6,716,666 | 6,949,217 | 6,750,083 | 7,014,451 | 6,777,259 | 6,923,524 |
| 6,557,978 | 6,991,207 | 6,766,998 | 6,967,354 | 6,759,723 | 6,870,259 | 10/853,270 |
| 6,925,875 | 10/898,214 | 7,095,109 | 7,145,696 | 10/976,081 | 7,193,482 | 7,134,739 |
| 7,222,939 | 7,164,501 | 7,118,186 | 7,201,523 | 7,226,159 | 7,249,839 | 7,108,343 |
| 7,154,626 | 7,079,292 | 10/980,184 | 7,233,421 | 7,063,408 | 10/983,082 | 10/982,804 |
| 7,032,996 | 10/982,834 | 10/982,833 | 10/982,817 | 7,217,046 | 6,948,870 | 7,195,336 |
| 7,070,257 | 10/986,813 | 10/986,785 | 7,093,922 | 6,988,789 | 10/986,788 | 7,246,871 |
| 10/992,748 | 10/992,747 | 7,187,468 | 10/992,828 | 7,196,814 | 10/992,754 | 7,268,911 |
| 7,265,869 | 7,128,384 | 7,164,505 | 7,284,805 | 7,025,434 | 7,298,519 | 7,280,244 |
| 7,206,098 | 7,265,877 | 7,193,743 | 7,168,777 | 11/006,734 | 7,195,329 | 7,198,346 |
| 7,281,786 | 11/013,363 | 11/013,881 | 6,959,983 | 7,128,386 | 7,097,104 | 11/013,636 |
| 7,083,261 | 7,070,258 | 7,083,275 | 7,110,139 | 6,994,419 | 6,935,725 | 11/026,046 |
| 7,178,892 | 7,219,429 | 6,988,784 | 11/026,135 | 7,289,156 | 11/064,005 | 7,284,976 |
| 7,178,903 | 7,273,274 | 7,083,256 | 11/064,008 | 7,278,707 | 11/064,013 | 6,974,206 |
| 11/064,004 | 7,066,588 | 7,222,940 | 11/075,918 | 7,018,025 | 7,221,867 | 7,290,863 |
| 7,188,938 | 7,021,742 | 7,083,262 | 7,192,119 | 11/083,021 | 7,036,912 | 7,175,256 |
| 7,182,441 | 7,083,258 | 7,114,796 | 7,147,302 | 11/084,757 | 7,219,982 | 7,118,195 |
| 7,229,153 | 6,991,318 | 7,108,346 | 11/248,429 | 11/239,031 | 7,178,899 | 7,066,579 |
| 11/281,419 | 11/298,633 | 11/329,188 | 11/329,140 | 7,270,397 | 7,258,425 | 7,237,874 |
| 7,152,961 | 11/478,592 | 7,207,658 | 11/484,744 | 7,311,257 | 7,207,659 | 11/525,857 |
| 11/540,569 | 11/583,869 | 11/592,985 | 11/585,947 | 7,306,307 | 11/604,316 | 11/604,309 |
| 11/604,303 | 11/643,844 | 11/650,553 | 11/655,940 | 11/653,320 | 7,278,713 | 11/706,381 |
| 11/706,323 | 11/706,963 | 11/713,660 | 7,290,853 | 11/696,186 | 11/730,390 | 11/737,139 |
| 11/737,749 | 11/740,273 | 11,749,122 | 11/754,361 | 11,766,043 | 11/764,775 | 11/768,872 |
| 11/775,156 | 11/779,271 | 11/779,272 | 11/829,938 | 11/839,502 | 11,858,852 | 11/862,188 |
| 11,859,790 | 11/872,618 | 11/923,651 | 11,950,255 | 11,930,001 | 11,955,362 | 11,965,718 |
| 6,485,123 | 6,425,657 | 6,488,358 | 7,021,746 | 6,712,986 | 6,981,757 | 6,505,912 |
| 6,439,694 | 6,364,461 | 6,378,990 | 6,425,658 | 6,488,361 | 6,814,429 | 6,471,336 |
| 6,457,813 | 6,540,331 | 6,454,396 | 6,464,325 | 6,443,559 | 6,435,664 | 6,412,914 |
| 6,488,360 | 6,550,896 | 6,439,695 | 6,447,100 | 09/900,160 | 6,488,359 | 6,637,873 |
| 10/485,738 | 6,618,117 | 10/485,737 | 6,803,989 | 7,234,801 | 7,044,589 | 7,163,273 |
| 6,416,154 | 6,547,364 | 10/485,744 | 6,644,771 | 7,152,939 | 6,565,181 | 10/485,805 |
| 6,857,719 | 7,255,414 | 6,702,417 | 7,284,843 | 6,918,654 | 7,070,265 | 6,616,271 |
| 6,652,078 | 6,503,408 | 6,607,263 | 7,111,924 | 6,623,108 | 6,698,867 | 6,488,362 |
| 6,625,874 | 6,921,153 | 7,198,356 | 6,536,874 | 6,425,651 | 6,435,667 | 10/509,997 |
| 6,527,374 | 10/510,154 | 6,582,059 | 10/510,152 | 6,513,908 | 7,246,883 | 6,540,332 |
| 6,547,368 | 7,070,256 | 6,508,546 | 10/510,151 | 6,679,584 | 10/510,000 | 6,857,724 |

-continued

| | | | | | | |
|---|---|---|---|---|---|---|
| 10/509,998 | 6,652,052 | 10/509,999 | 6,672,706 | 10/510,096 | 6,688,719 | 6,712,924 |
| 6,588,886 | 7,077,508 | 7,207,654 | 6,935,724 | 6,927,786 | 6,988,787 | 6,899,415 |
| 6,672,708 | 6,644,767 | 6,874,866 | 6,830,316 | 6,994,420 | 6,954,254 | 7,086,720 |
| 7,240,992 | 7,267,424 | 7,128,397 | 7,084,951 | 7,156,496 | 7,066,578 | 7,101,023 |
| 11/165,027 | 11/202,235 | 11/225,157 | 7,159,965 | 7,255,424 | 11/349,519 | 7,137,686 |
| 7,201,472 | 7,287,829 | 11/504,602 | 7,216,957 | 11/520,572 | 11/583,858 | 11/583,895 |
| 11/585,976 | 11/635,488 | 7,278,712 | 11/706,952 | 11/706,307 | 7,287,827 | 11,944,451 |
| 11/740,287 | 11/754,367 | 11/758,643 | 11/778,572 | 11,859,791 | 11/863,260 | 11/874,178 |
| 11/936,064 | 11,951,983 | 6,916,082 | 6,786,570 | 10/753,478 | 6,848,780 | 6,966,633 |
| 7,179,395 | 6,969,153 | 6,979,075 | 7,132,056 | 6,832,828 | 6,860,590 | 6,905,620 |
| 6,786,574 | 6,824,252 | 7,097,282 | 6,997,545 | 6,971,734 | 6,918,652 | 6,978,990 |
| 6,863,105 | 10/780,624 | 7,194,629 | 10/791,792 | 6,890,059 | 6,988,785 | 6,830,315 |
| 7,246,881 | 7,125,102 | 7,028,474 | 7,066,575 | 6,986,202 | 7,044,584 | 7,210,762 |
| 7,032,992 | 7,140,720 | 7,207,656 | 7,285,170 | 11/048,748 | 7,008,041 | 7,011,390 |
| 7,048,868 | 7,014,785 | 7,131,717 | 7,284,826 | 11/176,158 | 7,182,436 | 7,104,631 |
| 7,240,993 | 7,290,859 | 11/202,217 | 7,172,265 | 7,284,837 | 7,066,573 | 11/298,635 |
| 7,152,949 | 11/442,161 | 11/442,133 | 11/442,126 | 7,156,492 | 11/478,588 | 11/505,848 |
| 7,287,834 | 11/525,861 | 11/583,939 | 11/545,504 | 7,284,326 | 11/635,485 | 11/730,391 |
| 11/730,788 | 11/749,148 | 11/749,149 | 11/749,152 | 11/749,151 | 11/759,886 | 11/865,668 |
| 11/874,168 | 11/874,203 | 11,971,182 | 11,965,722 | 6,824,257 | 7,270,475 | 6,971,811 |
| 6,878,564 | 6,921,145 | 6,890,052 | 7,021,747 | 6,929,345 | 6,811,242 | 6,916,087 |
| 6,905,195 | 6,899,416 | 6,883,906 | 6,955,428 | 7,284,834 | 6,932,459 | 6,962,410 |
| 7,033,008 | 6,962,409 | 7,013,641 | 7,204,580 | 7,032,997 | 6,998,278 | 7,004,563 |
| 6,910,755 | 6,969,142 | 6,938,994 | 7,188,935 | 10/959,049 | 7,134,740 | 6,997,537 |
| 7,004,567 | 6,916,091 | 7,077,588 | 6,918,707 | 6,923,583 | 6,953,295 | 6,921,221 |
| 7,001,008 | 7,168,167 | 7,210,759 | 11/008,115 | 11/011,120 | 11/012,329 | 6,988,790 |
| 7,192,120 | 7,168,789 | 7,004,577 | 7,052,120 | 11/123,007 | 6,994,426 | 7,258,418 |
| 7,014,298 | 11/124,348 | 11/177,394 | 7,152,955 | 7,097,292 | 7,207,657 | 7,152,944 |
| 7,147,303 | 11/209,712 | 7,134,608 | 7,264,333 | 7,093,921 | 7,077,590 | 7,147,297 |
| 11/239,029 | 11/248,832 | 11/248,428 | 11/248,434 | 7,077,507 | 7,172,672 | 7,175,776 |
| 7,086,717 | 7,101,020 | 11/329,155 | 7,201,466 | 11/330,057 | 7,152,967 | 7,182,431 |
| 7,210,666 | 7,252,367 | 7,287,837 | 11/485,255 | 11/525,860 | 6,945,630 | 7,018,294 |
| 6,910,014 | 6,659,447 | 6,648,321 | 7,082,980 | 6,672,584 | 7,073,551 | 6,830,395 |
| 7,289,727 | 7,001,011 | 6,880,922 | 6,886,915 | 6,644,787 | 6,641,255 | 7,066,580 |
| 6,652,082 | 7,284,833 | 6,666,544 | 6,666,543 | 6,669,332 | 6,984,023 | 6,733,104 |
| 6,644,793 | 6,723,575 | 6,953,235 | 6,663,225 | 7,076,872 | 7,059,706 | 7,185,971 |
| 7,090,335 | 6,854,827 | 6,793,974 | 10/636,258 | 7,222,929 | 6,739,701 | 7,073,881 |
| 7,155,823 | 7,219,427 | 7,008,503 | 6,783,216 | 6,883,890 | 6,857,726 | 10/636,274 |
| 6,641,256 | 6,808,253 | 6,827,428 | 6,802,587 | 6,997,534 | 6,959,982 | 6,959,981 |
| 6,886,917 | 6,969,473 | 6,827,425 | 7,007,859 | 6,802,594 | 6,792,754 | 6,860,107 |
| 6,786,043 | 6,863,378 | 7,052,114 | 7,001,007 | 10/729,151 | 10/729,157 | 6,948,794 |
| 6,805,435 | 6,733,116 | 10/683,006 | 7,008,046 | 6,880,918 | 7,066,574 | 6,983,595 |
| 6,923,527 | 7,275,800 | 7,163,276 | 7,156,495 | 6,976,751 | 6,994,430 | 7,014,296 |
| 7,059,704 | 7,160,743 | 7,175,775 | 7,287,839 | 7,097,283 | 7,140,722 | 11/123,009 |
| 11/123,008 | 7,080,893 | 7,093,920 | 7,270,492 | 7,128,093 | 7,052,113 | 7,055,934 |
| 11/155,627 | 7,278,796 | 11/159,197 | 7,083,263 | 7,145,592 | 7,025,436 | 11/281,444 |
| 7,258,421 | 11/478,591 | 11/478,735 | 7,226,147 | 11/482,940 | 7,195,339 | 11/503,061 |
| 11/505,938 | 7,284,838 | 7,293,856 | 11/544,577 | 11/540,576 | 11/585,964 | 11/592,991 |
| 11/599,342 | 11/600,803 | 11/604,321 | 11/604,302 | 11/635,535 | 11/635,486 | 11/643,842 |
| 11/655,987 | 11/650,541 | 11/706,301 | 11/707,039 | 11/730,388 | 11/730,786 | 11/730,785 |
| 11/739,080 | 11/764,746 | 11/768,875 | 11/779,847 | 11/829,940 | 11,847,240 | 11/834,625 |
| 11/863,210 | 11/865,680 | 11/874,156 | 11/923,602 | 11,951,940 | 11,954,988 | 11,961,662 |
| 7,067,067 | 6,776,476 | 6,880,914 | 7,086,709 | 6,783,217 | 7,147,791 | 6,929,352 |
| 7,144,095 | 6,820,974 | 6,918,647 | 6,984,016 | 7,192,125 | 6,824,251 | 6,834,939 |
| 6,840,600 | 6,786,573 | 7,144,519 | 6,799,835 | 6,959,975 | 6,959,974 | 7,021,740 |
| 6,935,718 | 6,938,983 | 6,938,991 | 7,226,145 | 7,140,719 | 6,988,788 | 7,022,250 |
| 6,929,350 | 7,011,393 | 7,004,566 | 7,175,097 | 6,948,799 | 7,143,944 | 7,310,157 |
| 7,029,100 | 6,957,811 | 7,073,724 | 7,055,933 | 7,077,490 | 7,055,940 | 10/991,402 |
| 7,234,645 | 7,032,999 | 7,066,576 | 7,229,150 | 7,086,728 | 7,246,879 | 7,284,825 |
| 7,140,718 | 7,284,817 | 7,144,098 | 7,044,577 | 7,284,824 | 7,284,827 | 7,189,334 |
| 7,055,935 | 7,152,860 | 11/203,188 | 11/203,173 | 11/202,343 | 7,213,989 | 11/225,156 |
| 11/225,173 | 7,300,141 | 7,114,868 | 7,168,796 | 7,159,967 | 11/272,425 | 7,152,805 |
| 11/298,530 | 11/330,061 | 7,133,799 | 11/330,054 | 11/329,284 | 7,152,956 | 7,128,399 |
| 7,147,305 | 7,287,702 | 11/442,160 | 7,246,884 | 7,152,960 | 11/442,125 | 11/454,901 |
| 11/442,134 | 11/450,441 | 11/474,274 | 11/499,741 | 7,270,399 | 6,857,728 | 6,857,729 |
| 6,857,730 | 6,989,292 | 7,126,216 | 6,977,189 | 6,982,189 | 7,173,332 | 7,026,176 |
| 6,979,599 | 6,812,062 | 6,886,751 | 10/804,057 | 10/804,036 | 7,001,793 | 6,866,369 |
| 6,946,743 | 10/804,048 | 6,886,918 | 7,059,720 | 7,306,305 | 10/846,562 | 10/846,647 |
| 10/846,649 | 10/846,627 | 6,951,390 | 6,981,765 | 6,789,881 | 6,802,592 | 7,029,097 |
| 6,799,836 | 7,048,352 | 7,182,267 | 7,025,279 | 6,857,571 | 6,817,539 | 6,830,198 |
| 6,992,791 | 7,038,809 | 6,980,323 | 7,148,992 | 7,139,091 | 6,947,173 | 7,101,034 |
| 6,969,144 | 6,942,319 | 6,827,427 | 6,984,021 | 6,984,022 | 6,869,167 | 6,918,542 |
| 7,007,852 | 6,899,420 | 6,918,665 | 6,997,625 | 6,988,840 | 6,984,080 | 6,845,978 |
| 6,848,687 | 6,840,512 | 6,863,365 | 7,204,582 | 6,921,150 | 7,128,396 | 6,913,347 |
| 7,008,819 | 6,935,736 | 6,991,317 | 7,284,836 | 7,055,947 | 7,093,928 | 7,100,834 |
| 7,270,396 | 7,187,086 | 7,290,856 | 7,032,825 | 7,086,721 | 7,159,968 | 7,010,456 |
| 7,147,307 | 7,111,925 | 11/144,812 | 7,229,154 | 11/505,849 | 11/520,570 | 11/520,575 |
| 11/546,437 | 11/540,575 | 11/583,937 | 7,278,711 | 7,290,720 | 11/592,207 | 11/635,489 |
| 11/604,319 | 11/635,490 | 11/635,525 | 7,287,706 | 11/706,366 | 11/706,310 | 11/706,308 |

-continued

| | | | | | | |
|---|---|---|---|---|---|---|
| 11/785,108 | 11/744,214 | 11,744,218 | 11,748,485 | 11/748,490 | 11/764,778 | 11/766,025 |
| 11/834,635 | 11,839,541 | 11,860,420 | 11/865,693 | 11/863,118 | 11/866,307 | 11/866,340 |
| 11/869,684 | 11/869,722 | 11/869,694 | 11/876,592 | 11/945,244 | 11,951,121 | 11/945,238 |
| 11,955,358 | 11,965,710 | 11,962,050 | | | | |

BACKGROUND OF THE INVENTION

The Applicant has developed a wide range of printers that employ pagewidth printheads instead of traditional reciprocating printhead designs. Pagewidth designs increase print speeds as the printhead does not traverse back and forth across the page to deposit a line of an image. The pagewidth printhead simply deposits the ink on the media as it moves past at high speeds. Such printheads have made it possible to perform full colour 1600 dpi printing at speeds in the vicinity of 60 pages per minute, speeds previously unattainable with conventional inkjet printers.

The high print speeds require a large ink supply flow rate. Not only are the flow rates higher but distributing the ink along the entire length of a pagewidth printhead is more complex than feeding ink to a relatively small reciprocating printhead.

Some of the Applicant's printers provide the printhead as a user removable cartridge. This recognizes that individual ink ejection nozzles may fail over time and eventually there are enough dead nozzles to cause artifacts in the printed image. Allowing the user to replace the printhead maintains the print quality without requiring the entire printer to be replaced. It also permits the user to substitute a different printhead for different print jobs. A draft quality printhead can be installed for some low resolution documents printed at high speed, and subsequently removed and replaced with the original high resolution printhead.

A number of the Applicant's printhead cartridges do not have an inbuilt ink supply for the printhead. These printhead cartridges need to be fluidically coupled to the ink supply upon installation. The supply flowrate to the pagewidth printhead is too high for needle valves because of the narrow internal diameter. This requires the coupling conduits to be relatively large and therefore the engagement force required during installation is relatively high. The fluid seal is provided by a resilient element that is deformed during engagement. With larger conduits, the resilient element is larger and so to is the force required to deform it. Furthermore, full color printheads will have 3, 4 or even 5 separate couplings (CMY, CMYK, CMYKK or CMYK,IR) which only multiplies the additional coupling force necessary. Modern market expectations are that the installation and removal of cartridges and other consumables are simple and physically easy. It is also structurally undesirable to subject the cartridge to large forces. Flexing or bowing of the cartridge body can stress the electronics or nozzle structures.

SUMMARY OF THE INVENTION

Accordingly, the present invention provides a fluid coupling comprising:

a first conduit;

a second conduit having a seal seat and a compression member, the compression member being movable relative to the seal seat;

an annular seal positioned in the seal seat; and, an engagement mechanism for moving the second conduit from a disengaged position where there is no sealed fluid connection between the first and second conduits, and an engaged position where the compression member moves toward the seal seat to compress the annular seal to form a sealed fluid connection.

The invention uses an engagement mechanism to deform the annular seal instead of the force of one conduit being pushed into the other. The exertion needed to establish the sealed fluid coupling can be reduced or removed by incorporating mechanical advantage or power assistance into the engagement mechanism. Also there is no force acting on the first conduit so it is not subjected to structural stresses.

Preferably, the engagement mechanism moves the second conduit such that it telescopically engages the first conduit and the second conduit prior to compressing the annular seal. Preferably, the engagement mechanism is manually actuated and compresses the seal with the assistance of a lever system. Preferably, the first conduit is part of a cartridge and the second conduit is part of a device that uses the cartridge during operation, the lever system latches to the cartridge when it has moved the second conduit to the engaged position. Optionally, the first conduit slides within the second conduit during telescopic engagement. Preferably, the annular seal is a ring of resilient material. In a particularly preferred form, the ring of resilient material has a radial cross sectional shape with at least one straight side when uncompressed, and said at least one straight side bulging to a curved shape when compressed.

In some embodiments, the lever system completely disengages the second conduit from the first conduit when it moves the second conduit to the disengaged position. Preferably, the cartridge has a plurality of first conduits and the device has a corresponding plurality of second conduits, and the lever system actuates to simultaneously engage and disengage the plurality of first and second conduits. In a further preferred form, the coupling has a corresponding plurality of the annular seals for each of the second conduits respectively, wherein the compression member is arranged to compress all the annular seals respectively, the second conduits formed in an arrangement with a geometric centroid at which the lever system connects to the compression member. In a particularly preferred form, the second conduits are arranged in a circle and the lever system connects to the centre of the circle.

In some embodiments, the device is a print engine for an inkjet printer and the cartridge has an inkjet printhead. In these embodiments, it is preferable if the inkjet printhead is a pagewidth inkjet printhead such that the cartridge has an elongate configuration and the lever system has a hingedly mounted latch for releasably engaging the cartridge to secure it in the print engine when in the engaged position and allow the cartridge to be lifted from the print engine when in the disengaged position. Preferably, half of the plurality of first conduits extend from an inlet manifold at one end of the elongate cartridge, and half of the plurality of first conduits extend from an outlet manifold at the other end of the elongate cartridge.

In particular embodiments, the first conduits extend transversely to the longitudinal extent of the elongate cartridge such that the plurality of second conduits move transverse to the longitudinal extent of the elongate cartridge when moving between the engaged and disengaged positions.

Preferably, the second conduit has a shut off valve that opens when the first and second conduits are in the engaged position and closes when they are in the disengaged position.

In some preferred embodiments, the lever system has an input arm hinged to the compression member, the input arm having a compression lever fixed at an angle to the longitudinal extent of the input arm, the input arm arranged to push against the compression member as it rotates about the hinge connection to the compression member, the compression member in turn pushes against the second conduit to move it relative to the first conduit, until the input arm reaches a predetermined angle about the hinge where the compression lever engages the second conduit such that further rotation of the input arm moves the compression member relative to the second conduit to compress the annular seal.

In further preferred forms, the device has a chassis and the lever system latches the cartridge with a latch arm hinged to the chassis, the latch arm being fixed for rotation with an actuation arm hinged to the input arm, such that user actuation of the latch arm advances and retracts the second conduit and the compression member. Conveniently, the latch arm provides the longest lever arm of the lever system and so requires the least force to rotate.

BRIEF DESCRIPTION OF THE DRAWINGS

Preferred embodiments of the invention will now be described by way of example only, with reference to the accompanying drawings, in which.

DETAILED DESCRIPTION OF THE PREFERRED EMBODIMENTS

The invention will be described with specific reference to a fluid coupling between an inkjet print engine and its corresponding printhead cartridge. However, the ordinary worker will appreciate that the invention is equally applicable to other arrangements requiring a detachable fluid connection.

Figure 1:
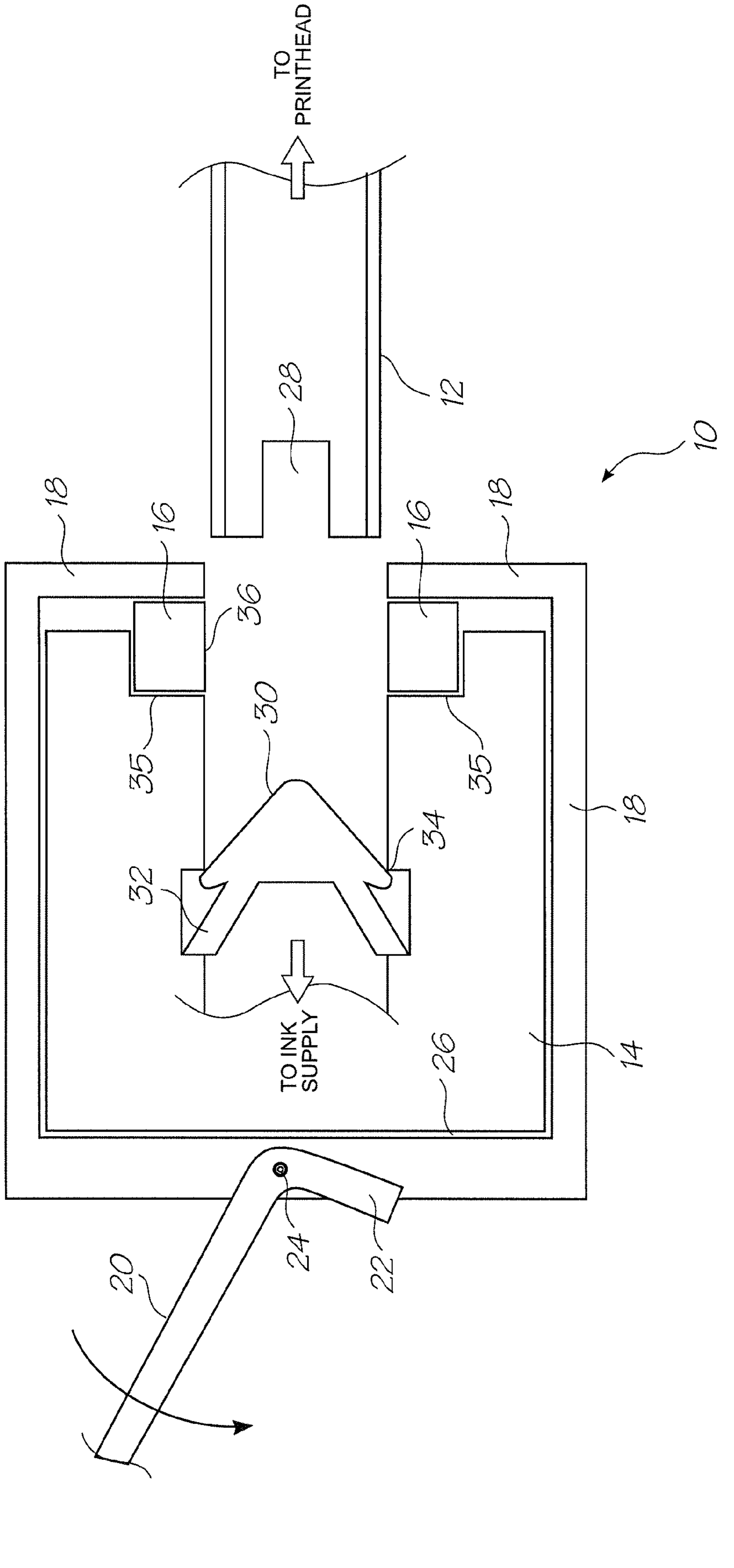
FIG. 1 is a schematic section view of a fluid coupling with the first and second conduits disengaged.

In FIG. 1, the fluid coupling 10 is shown with the first conduit 12 disengaged from the second conduit 14. The first conduit 12 leads to the pagewidth printhead of the removable printhead cartridge (described below). The second conduit 14 is connected to the ink supply (not shown) and sized such that it can telescopically engage the first conduit 12 with a sliding fit. The ink is retained by the shut off valve 30 biased against valve seat 34 by the resilient struts 32. The second conduit 14 defines a seal seat 35 for the annular seal 16. The annular seal 16 is retained in the seal seat 35 by the compression member 18. In the disengaged position shown in FIG. 1, the annular seal 16 is not compressed by the compression member 18 such that the inner surface 36 of the seal remains flat. When flat, the inner surface 36 does not to interfere with the sliding fit between the first and second conduits (12 and 14).

An input arm 20 is hinged to compression member 18. A compression lever 22 is fixed at an angle to the input arm 20. The input arm 20 and the compression lever 22 are part of a lever system described in greater detail below with reference to FIGS. 3 and 4. The lever system is an engagement mechanism that the user actuates to advance the second conduit 14 and compression member 18 onto the first conduit 12. As the input arm 20 rotates, it pushes on the hinge 24 which in turn moves the compression member 18 together with the second conduit 14.

Figure 2:
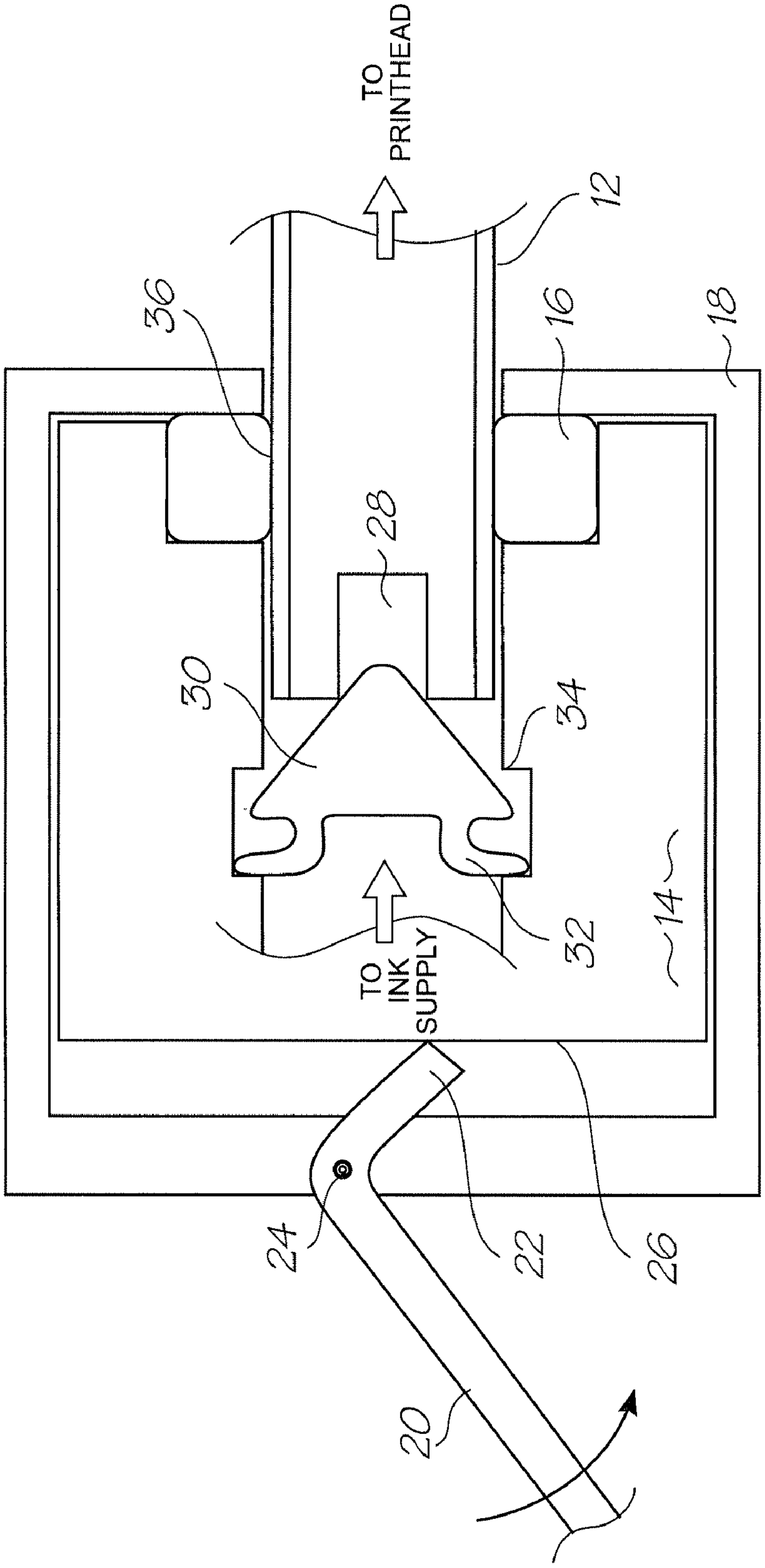
FIG. 2 is a schematic section view of a fluid coupling with the first and second conduits engaged.

As best shown in FIG. 2, the compression member 18 and the second conduit 14 advances until the input arm 20 is parallel to the direction of travel. Continued rotation of the input arm 20 brings the compression lever 22 into contact with the rear 26 of the second conduit 14. The compression lever 22 is carefully dimensioned to keep the second conduit 14 stationary relative to the first conduit 12 as the input arm 20 retracts the compression member 18 by pulling on the hinge 24. The compression member 18 compresses the annular seal 16 to force the flat inner surface 36 to bulge and form a fluid tight seal against the outside of the first conduit 12.

FIG. 2 also shows the first conduit 12 engaging the shut off valve 30 to open fluid communication between the ink supply and the printhead. The resilient struts 32 buckle with little resistance upon engagement with the end of the first conduit 12. Apertures 28 allow ink to flow around the valve member 30 and into the first conduit 12.

When the fluid coupling disengages, the input arm 20 is rotated in the opposite direction to simultaneously decompress the annular seal 16 and retract the second conduit 14 from the first conduit 12. This coupling is configured establish a sealed fluid connection with the first conduit subjected to little or no insertion force. In light of this, the structure that the supports the first conduit is not overly flexed or bowed. This protects any components that are not robust enough to withstand structural deformation.

Figure 3:
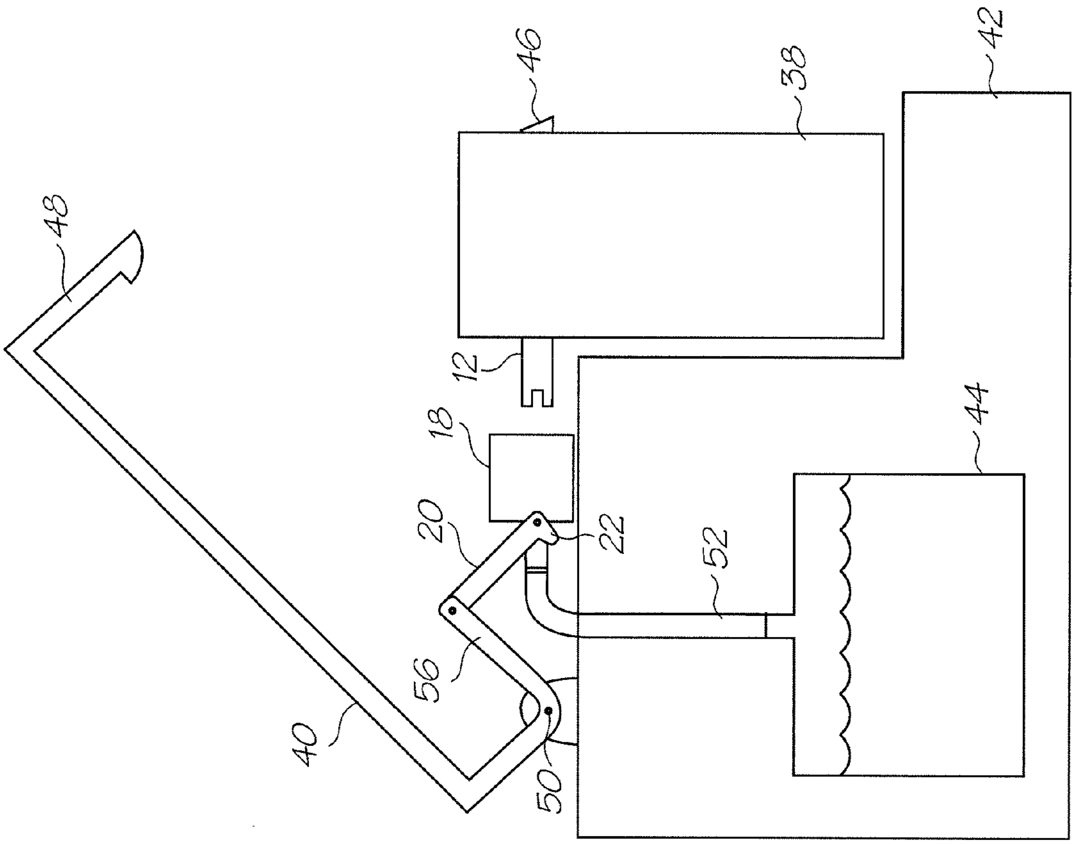
FIGS. 3 and 4 are diagrammatic sketches of the fluid coupling being used to connect a printhead cartridge and an inkjet printer.
Figure 4:
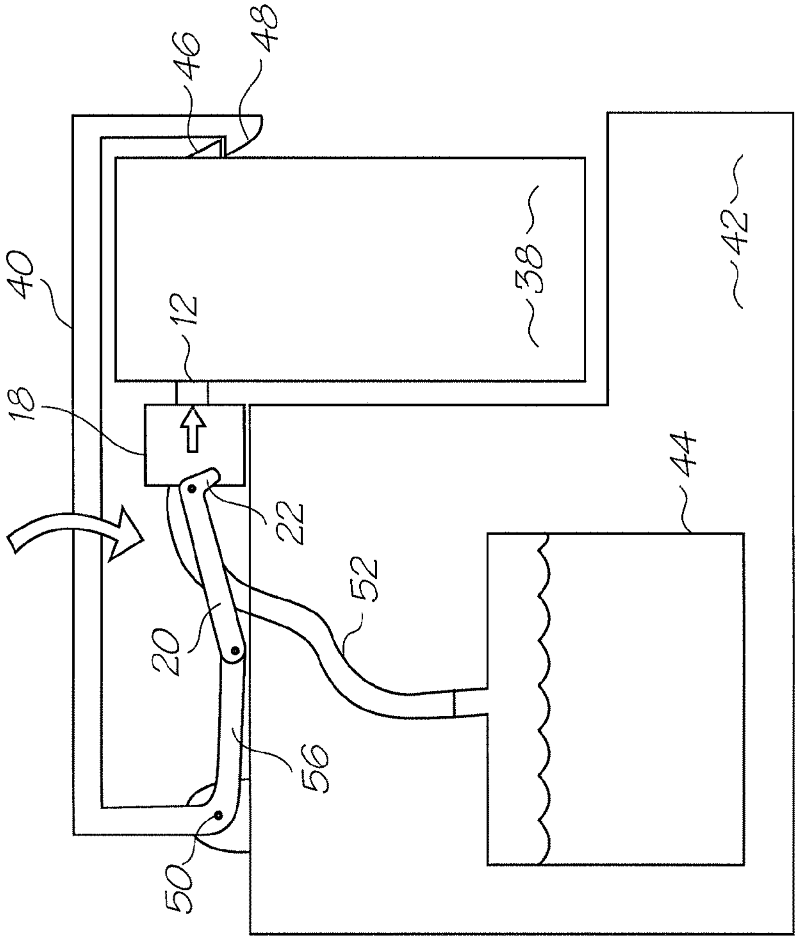

In FIGS. 3 and 4, the fluid coupling 10 is used to provide a detachable connection between the cartridge 38 and the printer 42. Referring to FIG. 3, the cartridge 38 is seated in the printer 42 such that the first conduits 12 face the compression member 18 (which covers the second conduits). The latch 40 is lifted to allow the cartridge to be installed. An actuator arm 56 is fixed relative to the latch 40 and rotates therewith about the hinge 50. The distal end of the actuator arm 56 is hinged to the input arm 20. When the latch is raised for cartridge installation or removal, the input arm 20 is likewise raised, which retracts the compression member 18 away from the first conduit 12. With the input arm in the raised and retracted position, the compression lever 22 is disengaged from the back of the second conduit (see 14 and 26 of FIG. 2). As discussed above, the annular seal is not compressed in the disengaged position so as not to interfere with the sliding fit with the first conduit.

Referring to FIG. 4, the fluid coupling 10 is engaged by simply lowering the latch 40 onto the cartridge 38 until the complementary snap-lock formations 46 and 48 engage. Actuator arm 56 rotates the input arm 20 and advances the compression member 18 towards the first conduit 12. The first conduit 12 telescopically engages the second conduit with a loose sliding fit until the actuator arm 56 and the input arm 20 are parallel to the direction of travel. When the second conduit is at its maximum engagement with the first conduit, the shut off valve is opened and the cartridge 38 is in fluid communication with ink tank 44 via the flexible tubing 52.

When the compression member is at its point of maximum travel towards the cartridge, the compression lever 22 engages the second conduit (not shown). The compression lever 22 is dimensioned to hold the second conduit stationary relative to the first conduit as the input arm 20 continues to rotate and draw the compression member 18 back to compress the seal and establish the fluid seal (see FIG. 2).

Figure 5:
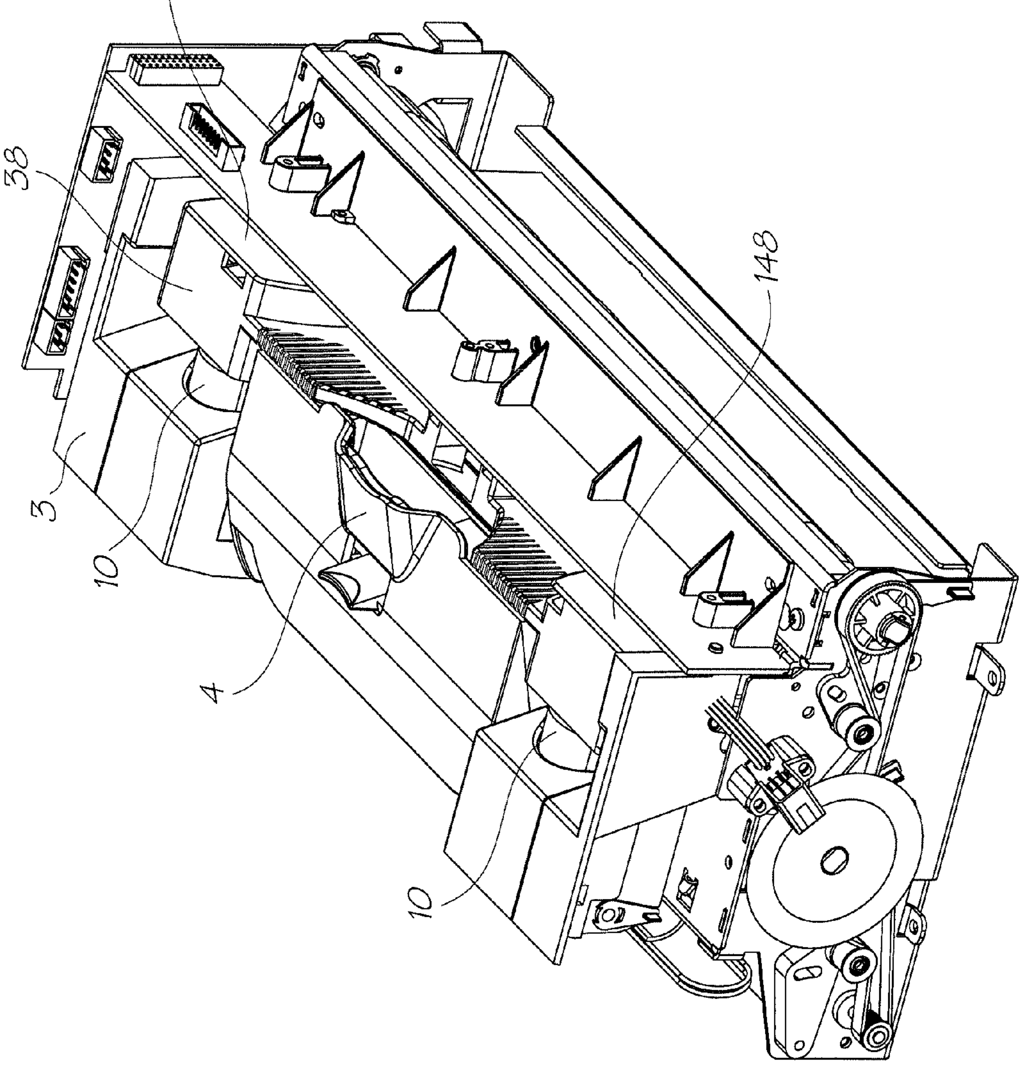
FIG. 5 is a section view of the fluid coupling being used to connect a printhead cartridge and a print engine.

FIG. 5 shows a printhead cartridge 38 installed in a print engine 3. The print engine 3 is the mechanical heart of a printer which can have many different external casing shapes, ink tank locations and capacities, as well as different media feed and collection trays. The printhead cartridge 38 is inserted and removed by the user lifting and lowering the latch 40. The print engine 3 forms an electrical connection with contacts on the printhead cartridge 38 and fluid couplings 10 are formed at the inlet and outlet manifolds, 148 and 150 respectively.

Figure 6:
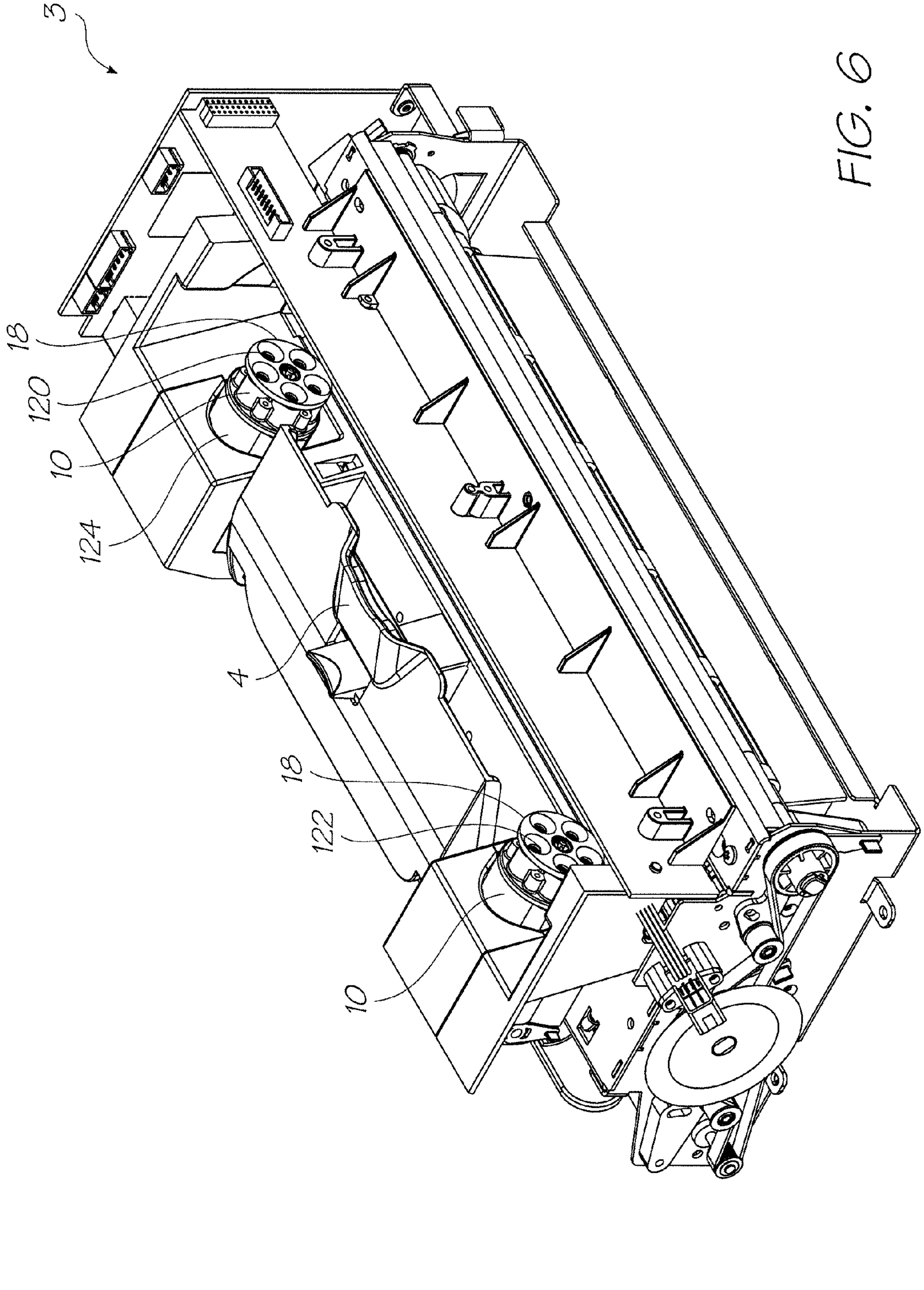
FIG. 6 is a perspective view of the print engine with the printhead cartridge.

FIG. 6 shows the print engine 3 with the printhead cartridge removed to reveal the apertures 120 in each of the compression members 18. Each aperture 120 receives one of the spouts 12 on the inlet and outlet manifolds (see FIG. 9). The spouts correspond to the first conduits 12 of the schematic representations of FIGS. 1-4. As discussed above, the ink tanks, media feed and collection trays have an arbitrary position and configuration depending on the design of the printer's outer casing.

Figure 7:
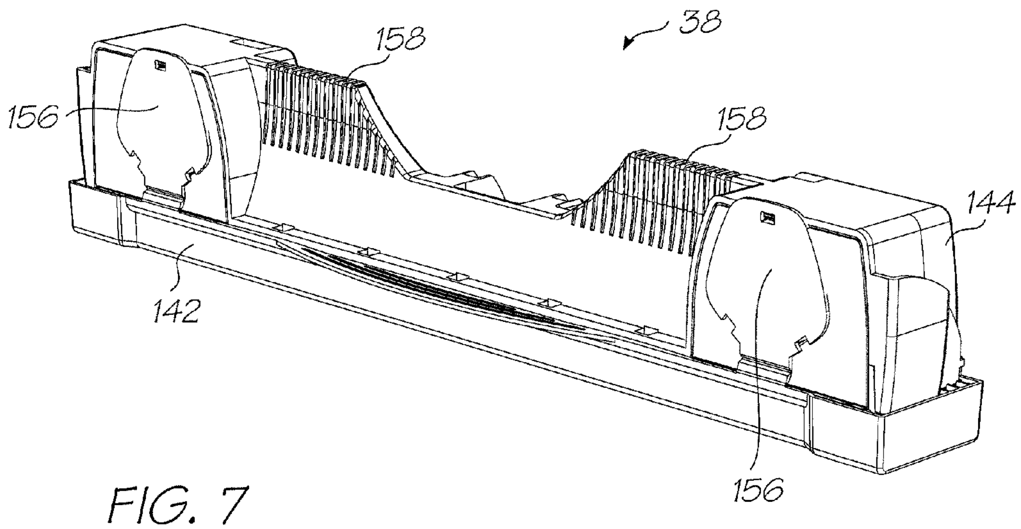
FIG. 7 is a perspective of the printhead cartridge.

FIG. 7 is a perspective of the complete printhead cartridge 38. The printhead cartridge 38 has a top molding 144 and a removable protective cover 142. The top molding 144 has a central web for structural stiffness and to provide grip textured surfaces 158 for manipulating the cartridge during insertion and removal. The base portion of the protective cover 142 protects the printhead ICs (not shown) and line of contacts (not shown) prior to installation in the printer. Caps 156 are integrally formed with the base portion to cover the inlet and outlet spouts (see 12 of FIG. 9).

Figure 8:
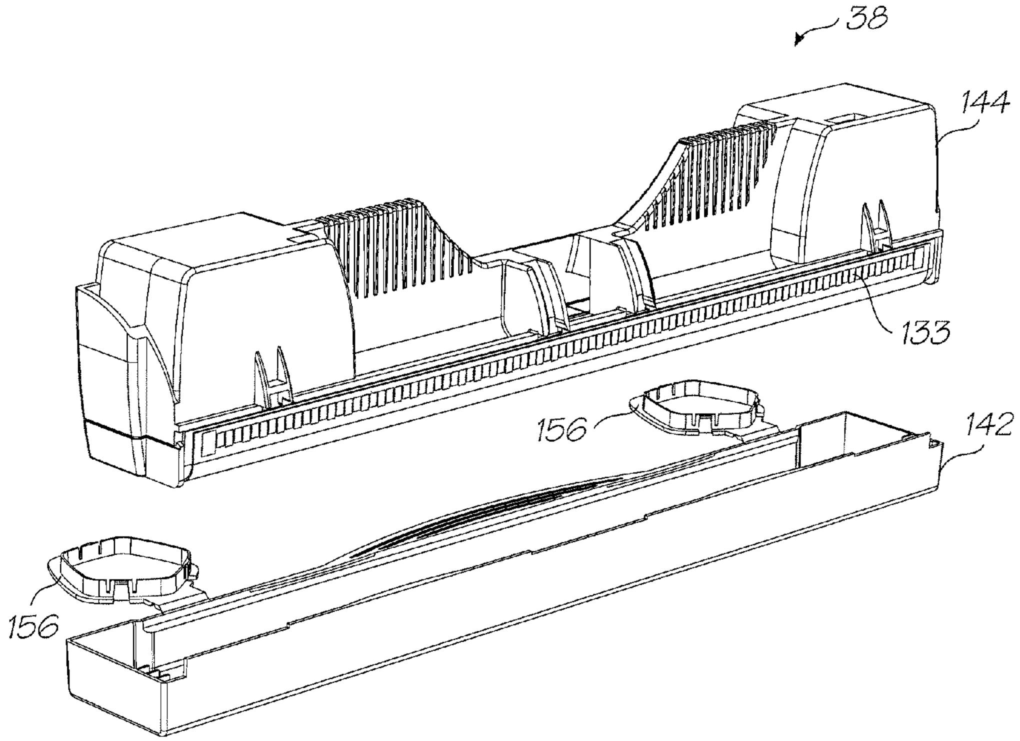
FIG. 8 shows the printhead cartridge of FIG. 7 with the protective cover removed.
Figure 9:
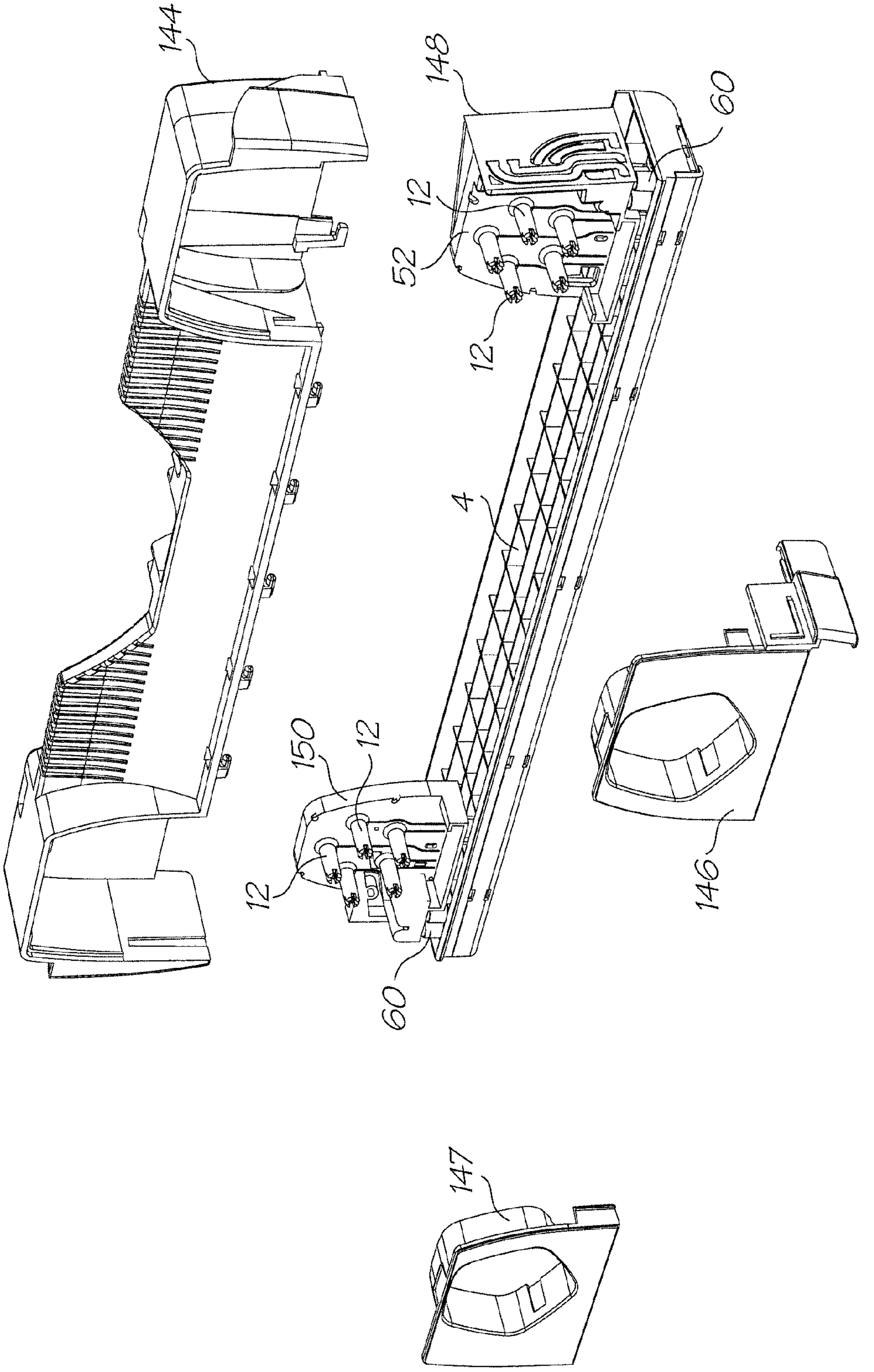
FIG. 9 is a partially exploded perspective of the cartridge of FIG. 8; and, FIG. 10 is a section view of the print engine and printhead cartridge through the fluid coupling.

FIG. 8 shows the cartridge 38 with its protective cover 142 removed to expose the printhead ICs (see FIG. 10) on the bottom surface and the line of contacts 133 on the side surface. The protective cover is discarded to the recycling waste or fitted to the printhead cartridge being replaced to contain leakage from residual ink. FIG. 9 is a partially exploded perspective of the cartridge 38 without the protective cover. The top cover 144 has been removed reveal the inlet manifold 148 and the outlet manifold 150. The inlet and outlet shrouds 146 and 147 have been removed to expose the five inlet and outlet spouts 12. The inlet and outlet manifolds 148 and 150 feed ink to their respective connectors 60 which lead to the molded liquid crystal polymer (LCP) channels 4 that supply the printhead ICs 31 (see FIG. 10). A detailed description of the fluid flows through the cartridge 38, and the printhead assembly within it, is provided by co-pending U.S. patent application Ser. No. 12/014,768, the disclosure of which is incorporated herein by cross reference.

Figure 10:
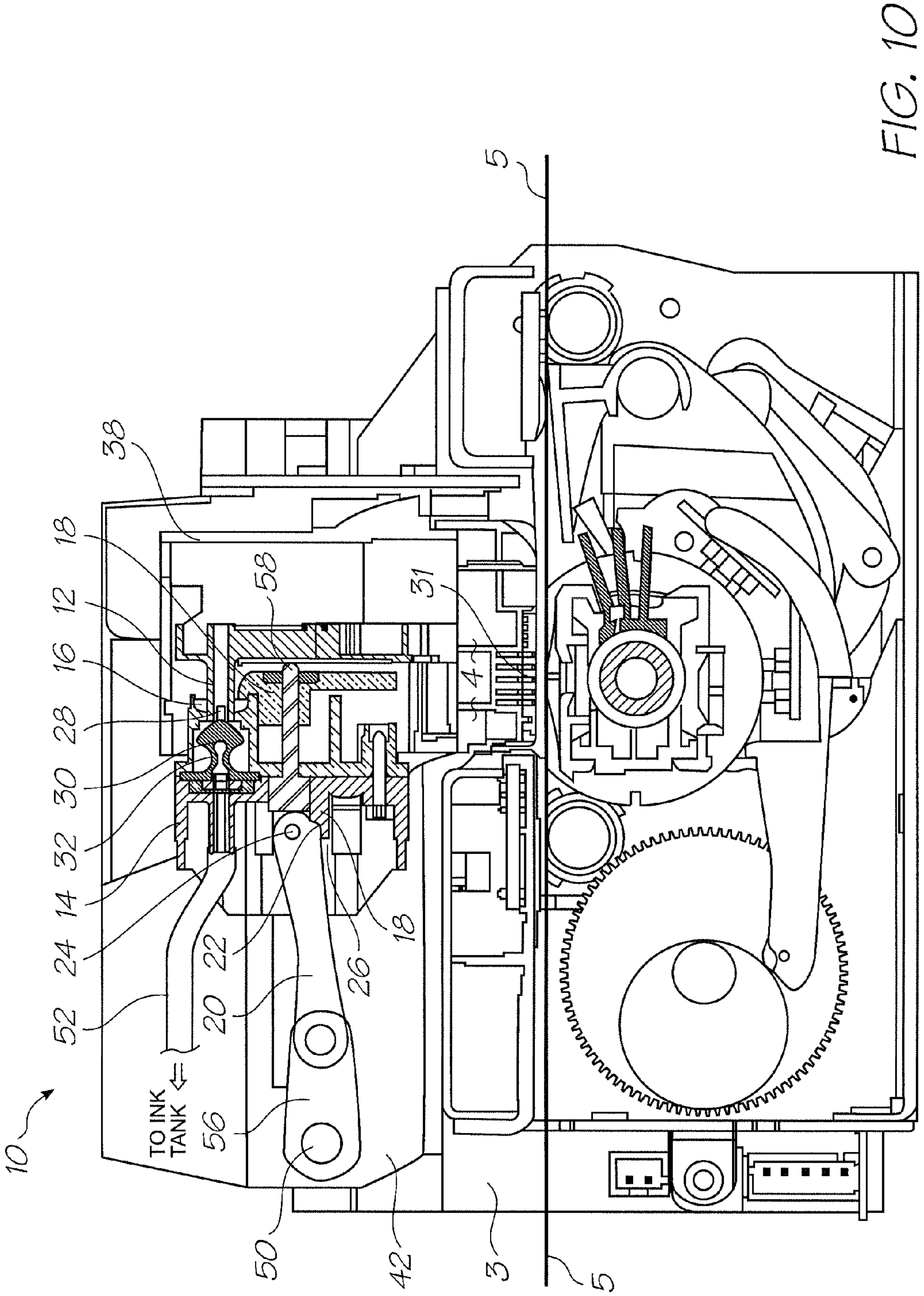

FIG. 10 is a section view through a fluid coupling 10 of the print engine 3 with the cartridge 38 installed. The components corresponding to the elements of the schematic representations of FIGS. 1-4 have been identified using the same reference numerals. For context, the paper path 5 is shown extending through the print engine 3 and past the printhead ICs 31.

The coupling is shown forming a sealed fluid connection between one of the spouts 12 and the one of the second conduits 14. It will be appreciated that the coupling at the inlet and outlet manifolds are identical with the exception that the ink flows from the second conduit 14 to the spout 12 at the inlet manifold and in the opposing direction at the outlet manifold. For the purposes of this description, the coupling will be described at the inlet manifold. Accordingly, flexible tubing 52 feeds ink from an ink tank (not shown) to the second conduit 14. The shut off valve 30 in the second conduit 14 is being held open by the end of the spout 12. The ink flows into the spout 12 and down to the LCP channel molding 4 where it is distributed to the printhead ICs 31.

The coupling 10 is actuated by the actuator arm 56 hinged to the print engine chassis 42 at shaft 50. As discussed above the latch 40 (not shown in FIG. 10) also extends from the shaft 50 for fixed rotation with the actuator arm 56. The actuator arm 56 rotates the input arm 20 to push the compression member 18, and in turn the second conduit 14 into telescopic engagement with the spout 12. Upon further rotation, the compression lever 22 engages the rear 26 of the second conduit 14. The input arm 20 draws back on the hinge connection 24 which in turn pulls on the central rod 58 extending to the middle of the compression member 18. The resilient seal 16 is compressed and bulges to form a fluid tight seal against the outer surface of the spout 12. It will be appreciated that the compression member 18 compresses all the annular seals 16 for each of the input spouts 12 simultaneously. Using a central rod 58 attached to the middle of the compression member 18 ensures that the compressive force on each annular seal is uniform. Furthermore, as the latch 40 is the longest lever of the lever system, the force that the user needs to apply is conveniently weak.

When the printhead cartridge 38 is to be replaced, the latch (not shown) is lifted off the cartridge to automatically rotate the actuator arm 56 upwards, thereby lifting and retracting the input arm 20. The annular seal 16 is released when the compression lever 22 swings out of engagement with the surface 26. The second conduits and the corresponding spouts 12 now have a loose sliding fit and slide easily away from each other. With the compression member 18 and the spouts 12 completely disengaged, the user simply lifts the cartridge 38 out of the print engine 3.

The above embodiments are purely illustrative and not restrictive or limiting on the scope of the invention. The skilled worker will readily recognize many variations and modifications which do not depart from the spirit and scope of the broad inventive concept.

The invention claimed is:

1. A fluid coupling comprising:

a first conduit;

a second conduit having a seal seat and a compression member, the compression member being movable relative to the seal seat;

an annular seal positioned in the seal seat;

an engagement mechanism for moving the second conduit from a disengaged position where there is no sealed fluid connection between the first and second conduits, and an engaged position where the compression member moves toward the seal seat to compress the annular seal to form a sealed fluid connection, the engagement mechanism having a lever system, the lever system having an input arm hinged to the compression member at a hinge connection, the input arm having a compression lever fixed at an angle to the longitudinal extent of the input arm, the input arm being arranged to push against the compression member as the input arm rotates about the hinge connection to the compression member, the compression member in turn pushes against the second conduit to move the second conduit relative to the first conduit, until the input arm reaches a predetermined angle about the hinge where the compression lever engages the second conduit such that further rotation of the input arm moves the compression member relative to the second conduit to compress the annular seal.

2. A fluid coupling according to claim 1 wherein the engagement mechanism moves the second conduit such that the engagement mechanism telescopically engages the first conduit and the second conduit prior to compressing the annular seal.

3. A fluid coupling according to claim 1 wherein the engagement mechanism is manually actuated.

4. A fluid coupling according to claim 1 wherein the first conduit is part of a cartridge and the second conduit is part of a device that uses the cartridge during operation, the lever system latches to the cartridge when the engagement mechanism has moved the second conduit to the engaged position.

5. A fluid coupling according to claim 2 wherein the first conduit slides within the second conduit during telescopic engagement.

6. A fluid coupling according to claim 1 wherein the annular seal is a ring of resilient material.

7. A fluid coupling according to claim 6 wherein the ring of resilient material has a radial cross sectional shape with at least one straight side when uncompressed, and said at least one straight side bulging to a curved shape when compressed.

8. A fluid coupling according to claim 4 wherein the lever system completely disengages the second conduit from the first conduit when the engagement mechanism moves the second conduit to the disengaged position.

9. A fluid coupling according to claim 8 wherein the cartridge has a plurality of first conduits and the device has a corresponding plurality of second conduits, and the lever system actuates to simultaneously engage and disengage the plurality of first and second conduits.

10. A fluid coupling according to claim 9 further comprising a corresponding plurality of the annular seals for each of the second conduits respectively, wherein the compression member is arranged to compress all the annular seals respectively, the second conduits formed in an arrangement with a geometric centroid at which the lever system connects to the compression member.

11. A fluid coupling according to claim 10 wherein the second conduits are arranged in a circle and the lever system connects to the centre of the circle.

12. A fluid coupling according to claim 9 wherein the device is a print engine for an inkjet printer and the cartridge has an inkjet printhead.

13. A fluid coupling according to claim 12 wherein the inkjet printhead is a pagewidth inkjet printhead such that the cartridge has an elongate configuration and the lever system has a hingedly mounted latch for releasably engaging the cartridge to secure the cartridge in the print engine when in the engaged position and allow the cartridge to be lifted from the print engine when in the disengaged position.

14. A fluid coupling according to claim 13 wherein half of the plurality of first conduits extend from an inlet manifold at one end of the elongate cartridge, and half of the plurality of first conduits extend from an outlet manifold at the other end of the elongate cartridge.

15. A fluid coupling according to claim 14 wherein the first conduits extend transversely to the longitudinal extent of the elongate cartridge such that the plurality of second conduits move transverse to the longitudinal extent of the elongate cartridge when moving between the engaged and disengaged positions.

16. A fluid coupling according to claim 1 wherein the second conduit has a shut off valve that opens when the first and second conduits are in the engaged position and closes when the first and second conduits are in the disengaged position.

17. A fluid coupling according to claim 1 wherein the device has a chassis and the lever system latches the cartridge with a latch arm hinged to the chassis, the latch arm being fixed for rotation with an actuation arm hinged to the input arm, such that user actuation of the latch arm advances and retracts the second conduit and the compression member.

18. A fluid coupling according to claim 17 wherein the latch arm provides the longest lever arm of the lever system and so requires the least force to rotate.

* * * * *